US011669112B2

(12) United States Patent
Chen et al.

(10) Patent No.: US 11,669,112 B2
(45) Date of Patent: Jun. 6, 2023

(54) PRESSURE REGULATOR AND GAS STORAGE DEVICE WITH THE SAME

(71) Applicant: BANZA STAMPING INDUSTRY CORP., Suao Township, Yilan County (TW)

(72) Inventors: Li-Wei Chen, Suao Township, Yilan County (TW); Shen-Kai Ho, Suao Township, Yilan County (TW); Tsang-Yao Lu, Suao Township, Yilan County (TW)

(73) Assignee: BANZA STAMPING INDUSTRY CORP., Suao Township, Yilan County (TW)

( * ) Notice: Subject to any disclaimer, the term of this patent is extended or adjusted under 35 U.S.C. 154(b) by 117 days.

(21) Appl. No.: 17/001,058

(22) Filed: Aug. 24, 2020

(65) Prior Publication Data
US 2021/0356976 A1   Nov. 18, 2021

(30) Foreign Application Priority Data
May 18, 2020   (TW) .................................. 109116447

(51) Int. Cl.
*G05D 16/10*   (2006.01)
*F17C 13/04*   (2006.01)

(52) U.S. Cl.
CPC ........... *G05D 16/109* (2019.01); *F17C 13/04* (2013.01); *F17C 2205/0338* (2013.01)

(58) Field of Classification Search
CPC .. G05D 16/0402; G05D 16/109; F17C 13/04; F17C 2205/0338; Y10T 137/7795; Y10T 137/7796; Y10T 137/7782
See application file for complete search history.

(56) References Cited

U.S. PATENT DOCUMENTS

| 3,111,946 | A  | * | 11/1963 | Galeazzi | ............. | B63C 11/2236 |
|           |    |   |         |          |               | 137/557       |
| 7,334,598 | B1 | * | 2/2008  | Hollars  | ................ | G05D 16/106 |
|           |    |   |         |          |               | 251/332       |
| 9,310,812 | B2 | * | 4/2016  | Costle   | ................ | G05D 16/0402 |

(Continued)

FOREIGN PATENT DOCUMENTS

CN         207514319 U   *   6/2018

OTHER PUBLICATIONS

Machine Translation of CN207514319 retrieved Jun. 2022 (Year: 2022).*

*Primary Examiner* — Jessica Cahill
(74) *Attorney, Agent, or Firm* — Muncy, Geissler, Olds & Lowe, P.C.

(57) ABSTRACT

A pressure regulator has a valve tube assembly, a gas-input assembly, a first regulating assembly and a second regulating assembly. The gas storage device has a storage unit and the pressure regulator. By the first and the second regulating assemblies, the effect of adjusting down the gas pressure is achieved to maintain the safety of use. The pressure regulator is partially embedded in the gas storage unit to reduce the overall volume of the gas storage device. However, the high-pressure piston chamber of the valve tube assembly communicates with the outside of the gas storage unit through the high-pressure gas channel to maintain the normal operation of the elastic element in the high-pressure piston chamber.

6 Claims, 35 Drawing Sheets

(56) References Cited

U.S. PATENT DOCUMENTS

| | | | |
|---|---|---|---|
| 10,655,786 B1* | 5/2020 | Dean | F16K 3/085 |
| 2006/0157122 A1* | 7/2006 | Kawamura | G05D 16/103 |
| | | | 137/613 |
| 2007/0017524 A1* | 1/2007 | Wilson | G05D 16/103 |
| | | | 128/205.24 |
| 2010/0276614 A1* | 11/2010 | Patterson | G05D 16/0663 |
| | | | 251/12 |
| 2012/0181287 A1* | 7/2012 | Holbeche | G05D 16/103 |
| | | | 220/582 |

* cited by examiner

PRESSURE REGULATOR AND GAS STORAGE DEVICE WITH THE SAME

CROSS-REFERENCE TO RELATED APPLICATIONS

This application is based upon and claims priority under 35 U.S.C. 119 from Taiwan Patent Application No. 109116447 filed on May 18, 2020, which is hereby specifically incorporated herein by this reference thereto.

BACKGROUND OF THE INVENTION

1. Field of the Invention

The present invention relates to a pressure regulator, and more particularly to a pressure regulator applicable for a high-pressure gas storage unit.

2. Description of the Prior Arts

A conventional pressure regulator is commonly adopted to reduce a gas pressure from a high pressure source to a usable level required by a gas output end. Nowadays, the conventional pressure regulators are comprehensively applied in various kinds of the apparatuses. The conventional pressure regulator has a regulating assembly to selectively intercept a gas flow from the high pressure source to the gas output end. When a pressure of the gas output end reaches to a predetermined value, the regulating assembly would be able to shut down the gas flow and maintain the pressure value that is required at the gas output end. As to the condition that the pressure difference is relatively higher between the high pressure source and the gas output end, some of the conventional pressure regulators would provide the multi-level regulating devices in consideration of the safety and the precision of the pressure adjustment. In other words, the conventional pressure regulators would be equipped with multiple sets of the regulating assemblies to reduce the gas pressure down to a required level in sequence by different sets of the regulating assemblies.

However, using more sets of the regulating assemblies would inevitably make the overall volume of the conventional pressure regulator enlarged. When it refers to an application for a mobile high pressure source (such as a gas storage unit of an air gun), the enlarged volume caused by the multi-level regulating assemblies would make the overall volume of the mobile high pressure source increased as well. It is the drawback for the users to carry the enlarged mobile high pressure source inconveniently.

SUMMARY OF THE INVENTION

To overcome the shortcomings, the present invention provides a pressure regulator and gas storage device with the same to mitigate or to obviate the aforementioned problems.

A pressure regulator has a valve tube assembly, a gas-input assembly, a first regulating assembly and a second regulating assembly. The gas storage device has a storage unit and the pressure regulator. By the first and the second regulating assemblies, the effect of adjusting down the gas pressure is achieved to maintain the safety of use. The pressure regulator is partially embedded in the gas storage unit to reduce the overall volume of the gas storage device. However, the high-pressure piston chamber of the valve tube assembly communicates with the outside of the gas storage unit through the high-pressure gas channel to maintain the normal operation of the elastic element in the high-pressure piston chamber.

A pressure regulator has a valve tube assembly, a gas-input assembly, a first regulating assembly and a second regulating assembly. The gas storage device has a storage unit and the pressure regulator. By the first and the second regulating assemblies, the effect of adjusting down the gas pressure is achieved to maintain the safety of use. The pressure regulator is partially embedded in the gas storage unit to reduce the overall volume of the gas storage device. However, the high-pressure piston chamber of the valve tube assembly communicates with the outside of the gas storage unit through the high-pressure gas channel to maintain the normal operation of the elastic element in the high-pressure piston chamber.

Other objectives, advantages and novel features of the invention will become more apparent from the following detailed description when taken in conjunction with the accompanying drawings.

DETAILED DESCRIPTION OF THE EMBODIMENTS

Figure 1:
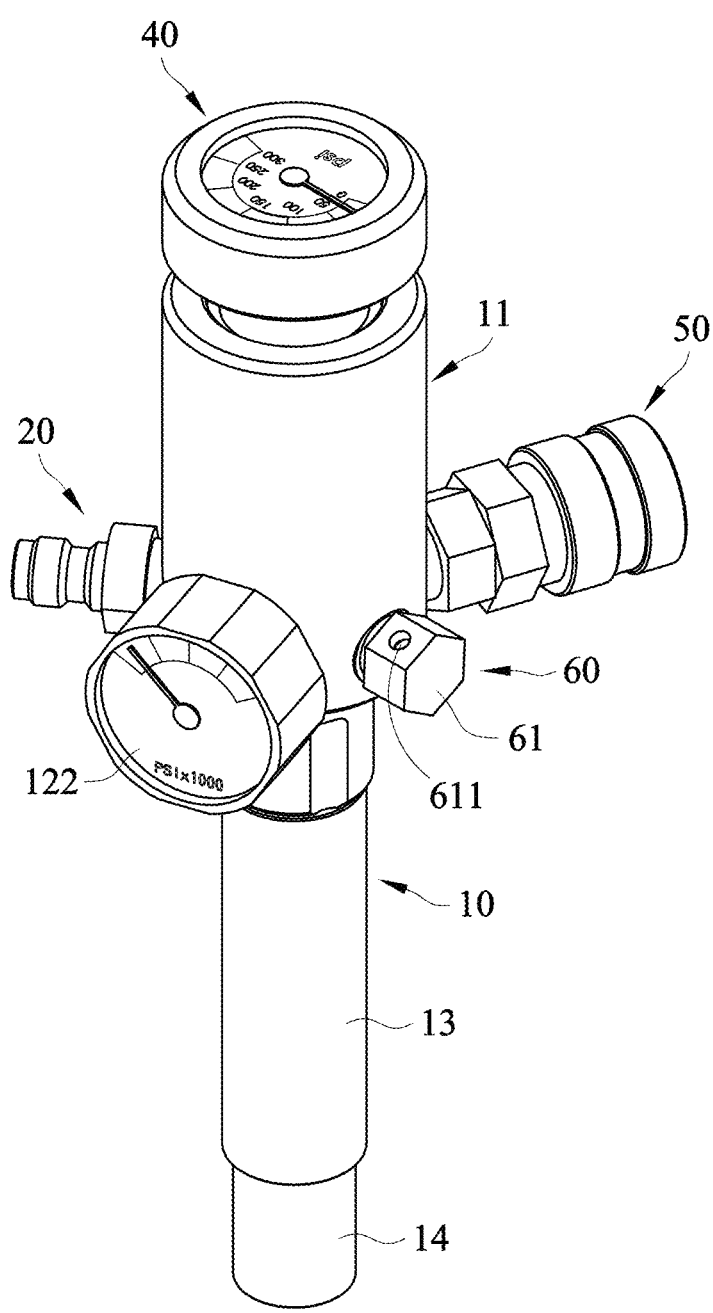
FIG. 1 is a perspective view of a pressure regulator in accordance with the present invention.

With reference to the attached drawings, the present invention is described by the embodiments below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimensions ratios can be selectively designed and disposed and the detail component layouts may be more complicated.

With reference to FIGS. 1 to 4, a pressure regulator 1 in accordance with the present invention comprises a valve tube assembly 10, a gas-input assembly 20, a first regulating assembly 30, a second regulating assembly 40, and a gas-output assembly 50.

Figure 4:
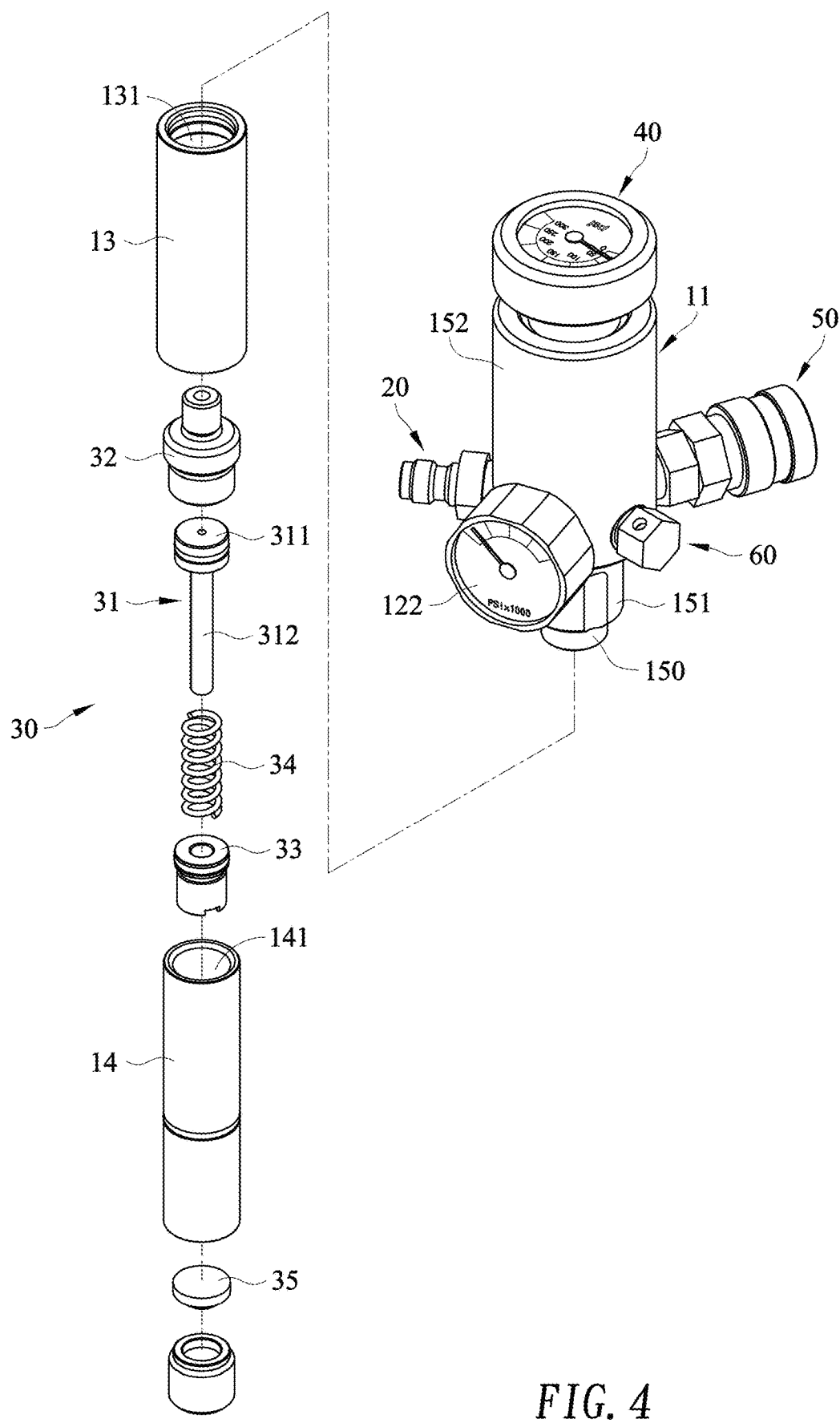
FIG. 4 is an exploded view of an illustrated part of a pressure regulator in accordance with the present invention.

With reference to FIG. 4, the valve tube assembly 10 has an external tube 11, a first internal tube 13 and a second internal tube 14.

With reference to FIGS. 5 and 6A to 6E, the external tube 11 has an axial channel. The axial channel has an intermediate chamber 110, a low-pressure chamber 111 and a low-pressure piston chamber 112 arranged in sequence. In an embodiment, the external tube 11 has an intermediate section 150, a low-pressure section 151 and an extension section 152, wherein the low-pressure section 151 connects the intermediate section 150 and the extension section 152. The exterior diameters of the external tube 11 are grown wider from the intermediate section 150 to the extension section 152, so that the connecting portions of the adjacent sections are formed as a stepped surface. As a result, an end surface 161, an intermediate surface 162 and a shoulder 163 are formed sequentially. The end surface 161 is disposed at an end of the intermediate section 150. The intermediate chamber 110 is disposed within the intermediate section 150 and the low-pressure section 151. The low-pressure chamber 111 as well as the low-pressure piston chamber 112 are disposed within the extension section 152. The external tube 11 has a gas inlet orifice 113 and a gas outlet orifice 114 formed transversely through the external tube 11. The gas inlet orifice 113 communicates with a gas-input channel 115 which is disposed axially in the external tube 11. The gas-input channel 115 has a first opening and a second opening. The first opening is formed through the intermediate surface 162. The second opening communicates with the gas inlet orifice 113. In an embodiment, a test orifice 116 and an anti-explosion orifice 117 are disposed adjacent to the gas inlet orifice 113 transversely. The test orifice 116 communicates with the gas inlet orifice 113 throughout the gas-input channel 115. The anti-explosion orifice 117 communicates with the gas inlet orifice 113 throughout an anti-explosion channel 118. The gas outlet orifice 114 communicates with the low-pressure chamber 111. In an embodiment, the external tube 11 has a gas releasing orifice 119 communicating with the low-pressure chamber 111. The external tube 11 has a high-pressure exhaustion channel 120 having an axial part and a radial part, the axial part of the high-pressure exhaustion channel 120 has a first opening formed through the end surface 161 of the external tube 11 while the radial part of the high-pressure exhaustion channel 120 has a second opening formed through the extension section 152. When a gas storage unit 90 is connected, the radial part of the high-pressure exhaustion channel 120 formed through the extension section 152 is disposed outside the gas storage unit 90. The external tube 11 further has a low-pressure exhaustion channel 121 which is formed transversely through the external tube 11 and communicates with the low-pressure piston chamber 112.

Figure 7:
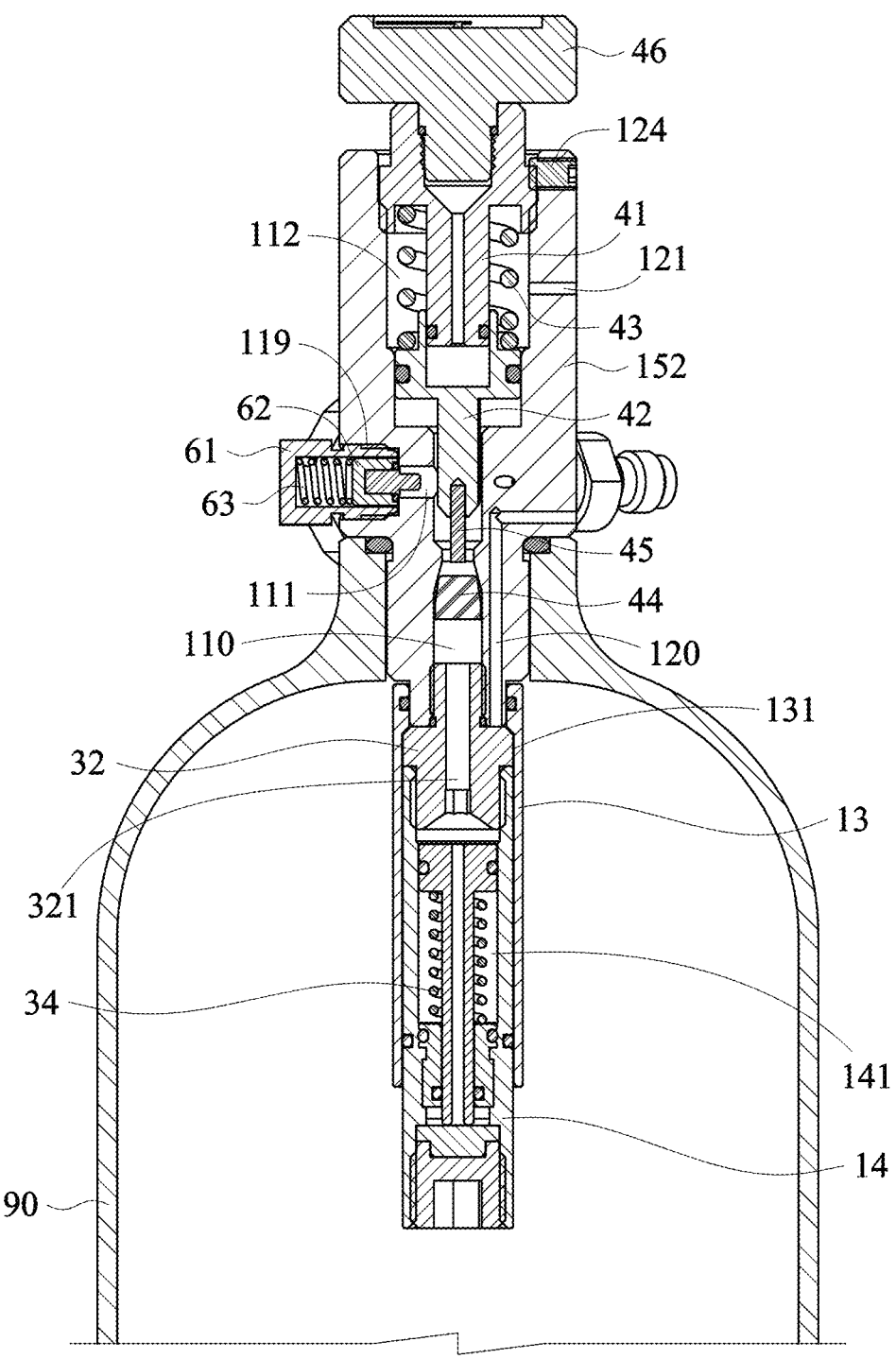
FIG. 7 is a cross sectional view from a first lateral side of a gas storage device showing an internal action of the gas storage device in accordance with the present invention.
Figure 8:
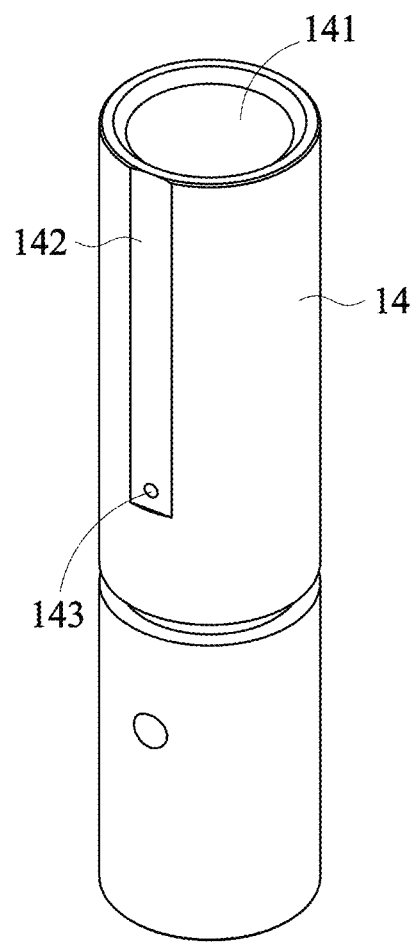
FIG. 8 is a perspective view of a second internal tube of a pressure regulator in accordance with the present invention.

With reference to FIG. 4 and FIG. 7, the external tube 11 has an end disposed inside the first internal tube 13. The first internal tube 13 has a chamber 131 thoroughly communicating with the high-pressure exhaustion channel 120 axially. In an embodiment, the first internal tube 13 is mounted outside the intermediate section 150 of the external tube 11.

With reference from FIG. 4 and FIG. 7 to FIG. 9, the second internal tube 14 aforementioned is mounted in the first internal tube 13. The high-pressure piston chamber 141 is formed within the second internal tube 14 and is formed axially through the second internal tube 14. The second internal tube 14 has an external wall having an elongated groove 142 which is formed on the external wall. The elongated groove 142 has a high-pressure exhaustion hole 143 formed transversely through the second internal tube 14. Therefore, the high-pressure exhaustion hole 143 communicates with the high-pressure piston chamber 141, the high-pressure piston chamber 141 communicates with the chamber 131 of the first internal tube 13 throughout the high-pressure exhaustion hole 143, and the high-pressure piston chamber 141 further communicates with the high-pressure exhaustion channel 120 of the external tube 11 throughout the chamber 131 of the first internal tube 13.

Figure 2:
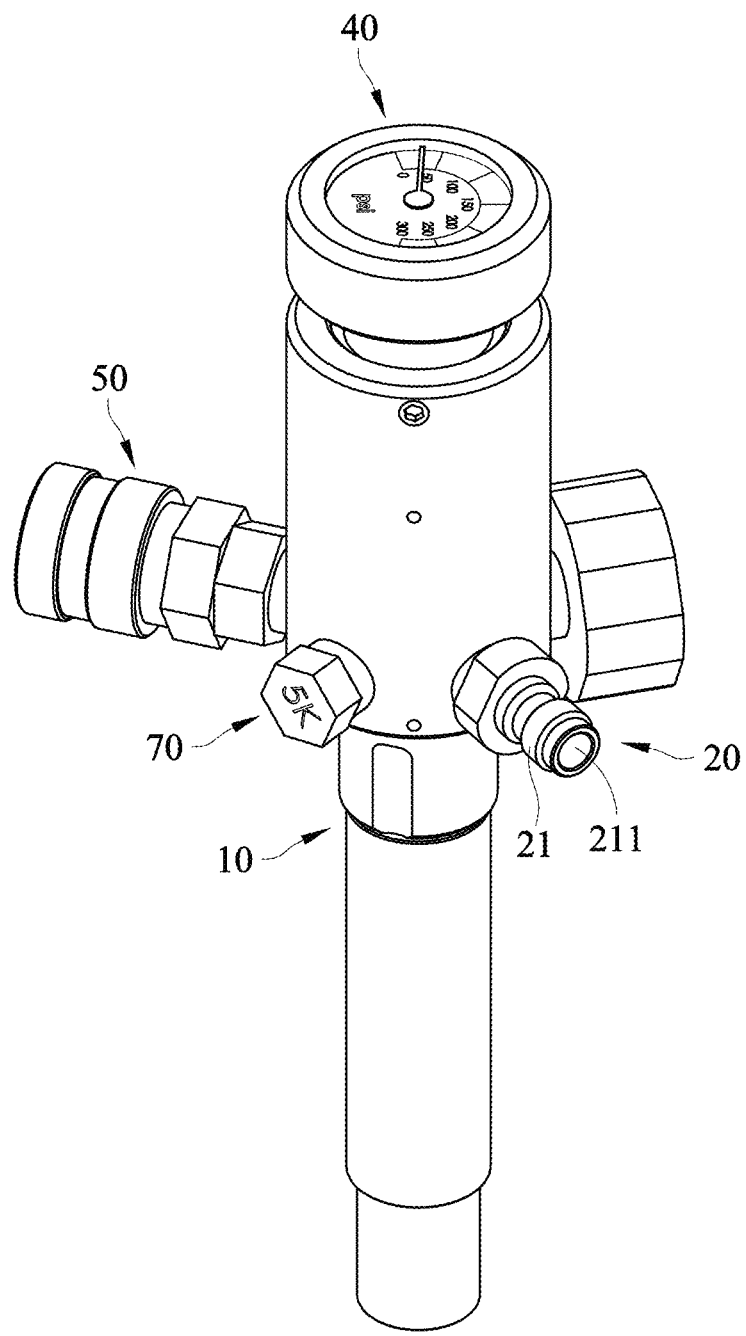
FIG. 2 is another perspective view of a pressure regulator in accordance with the present invention.
Figure 3:
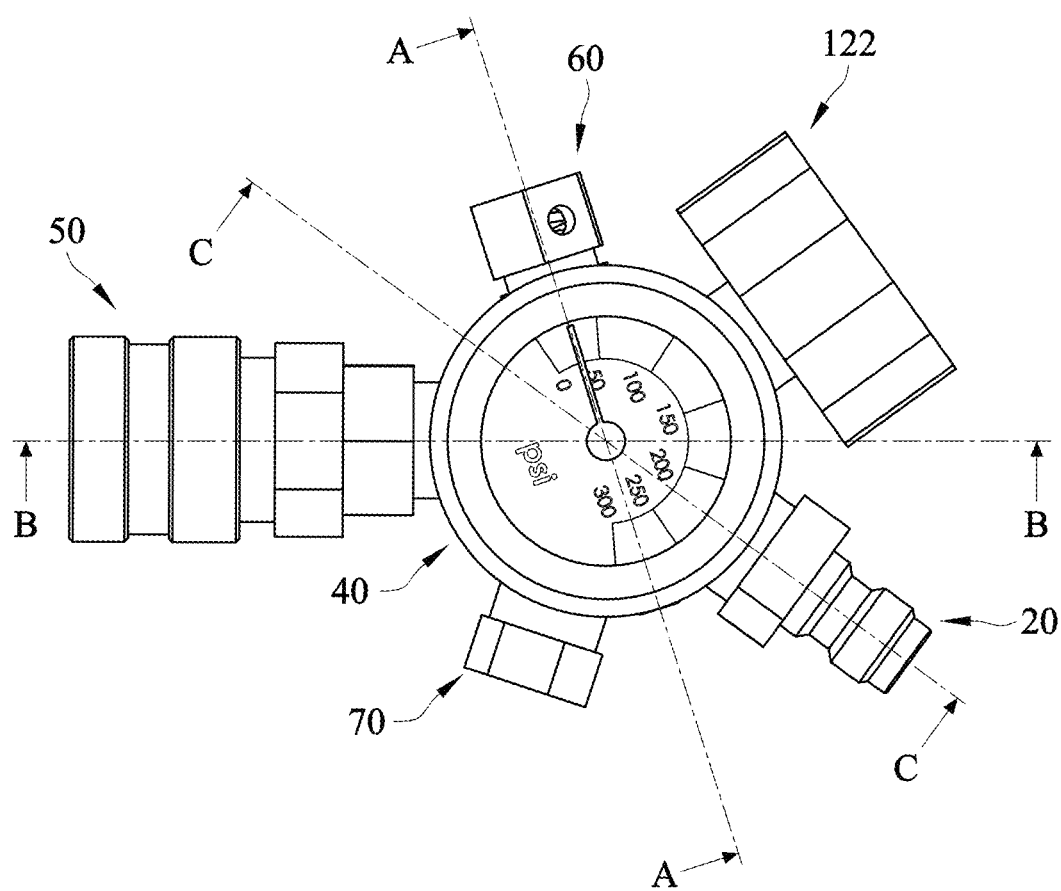
FIG. 3 is a top view of a pressure regulator in accordance with the present invention.
Figure 6C:
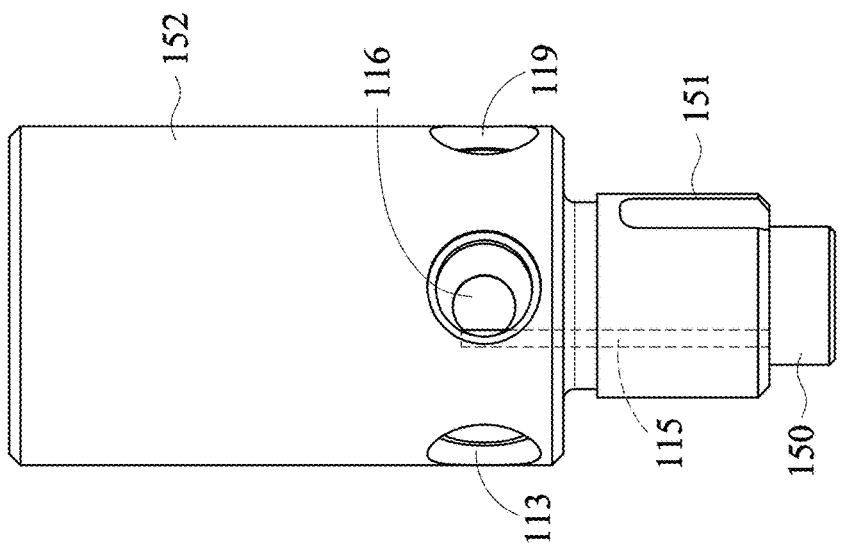
FIG. 6A to 6E are multiple lateral views of an external tube of a pressure regulator in accordance with the present invention.
Figure 6B:
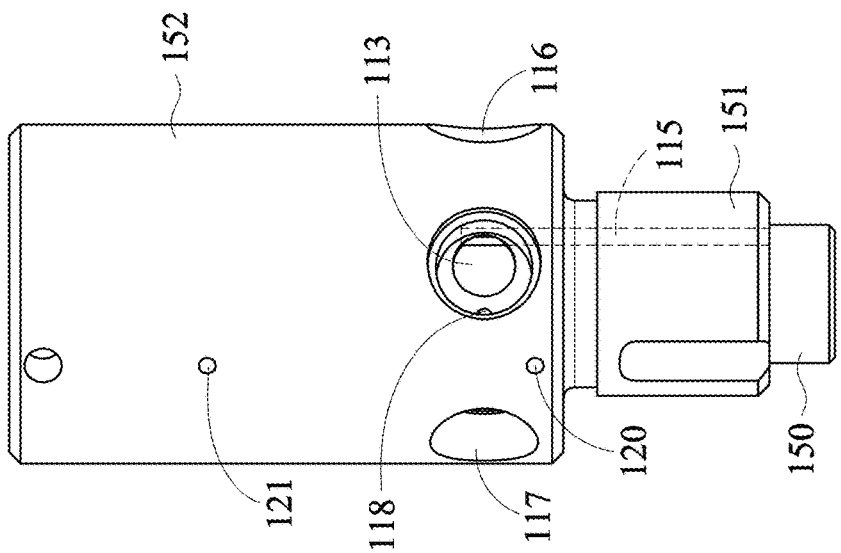
Figure 10:
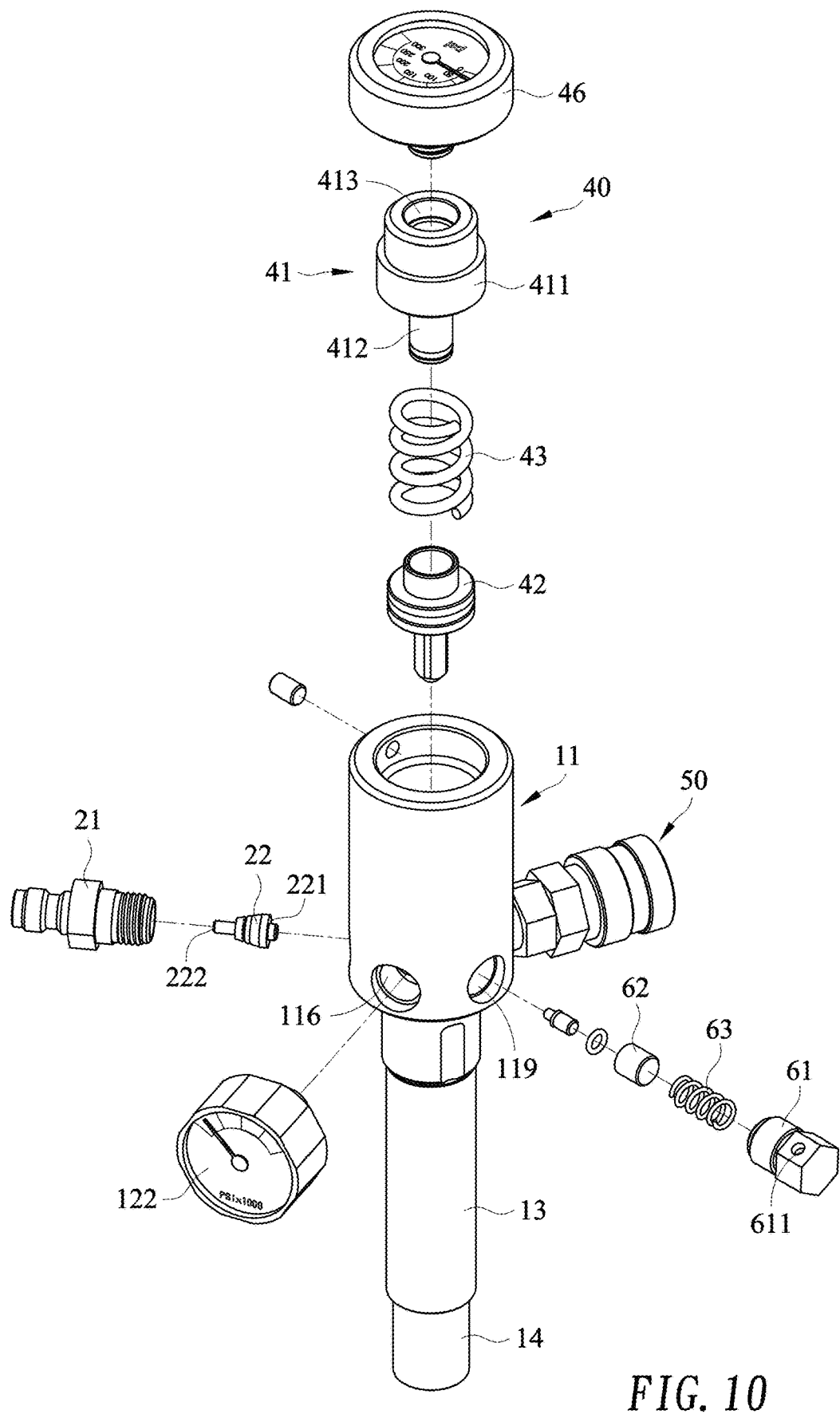
FIG. 10 is an exploded view of another illustrated part of a pressure regulator in accordance with the present invention.

With reference to FIG. 2, FIG. 6B and FIG. 10, the gas-input assembly 20 is disposed in the gas inlet orifice 113 of the external tube 11. The gas inlet orifice 113 is closed by the gas-input assembly 20 normally. When the gas-input assembly 20 is connected to a high-pressure source, the high-pressure source injects a high-pressure gas into the gas-input channel 115 throughout the gas-input assembly 20. In an embodiment, the gas-input assembly 20 has a gas-input tube 21 and a gas-input plug 22. The gas-input tube 21 is mounted within the gas inlet orifice 113 and has a central hole 211, the gas-input plug 22 has a wider end 221 and a narrower end 222. The narrower end 222 of the gas-input plug 22 is disposed corresponding to the central hole 211 of the gas-input tube 21.

Figure 11:
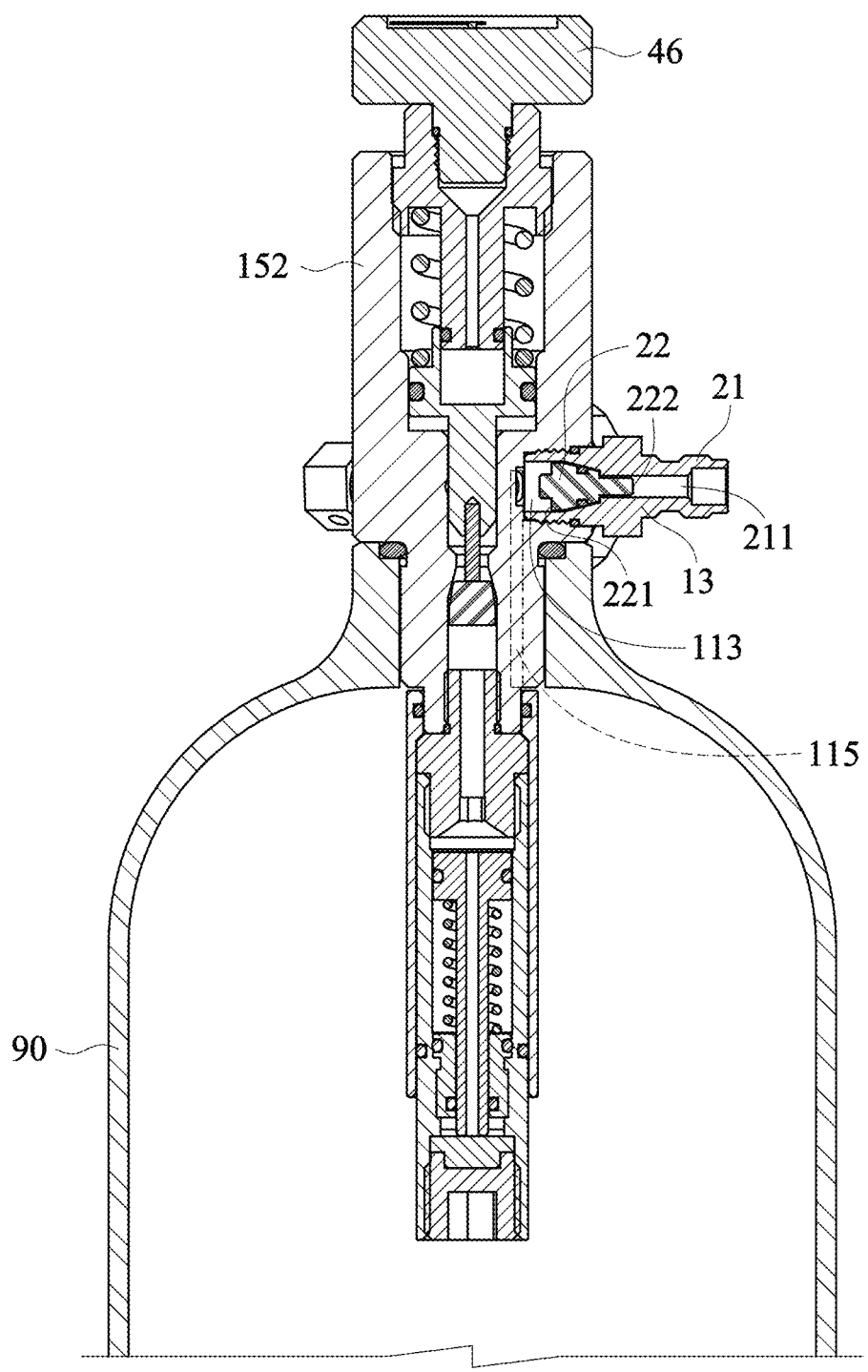
FIG. 11 is a cross sectional view from a third lateral side of a gas storage device showing an internal action of the gas storage device in accordance with the present invention.
Figure 12:
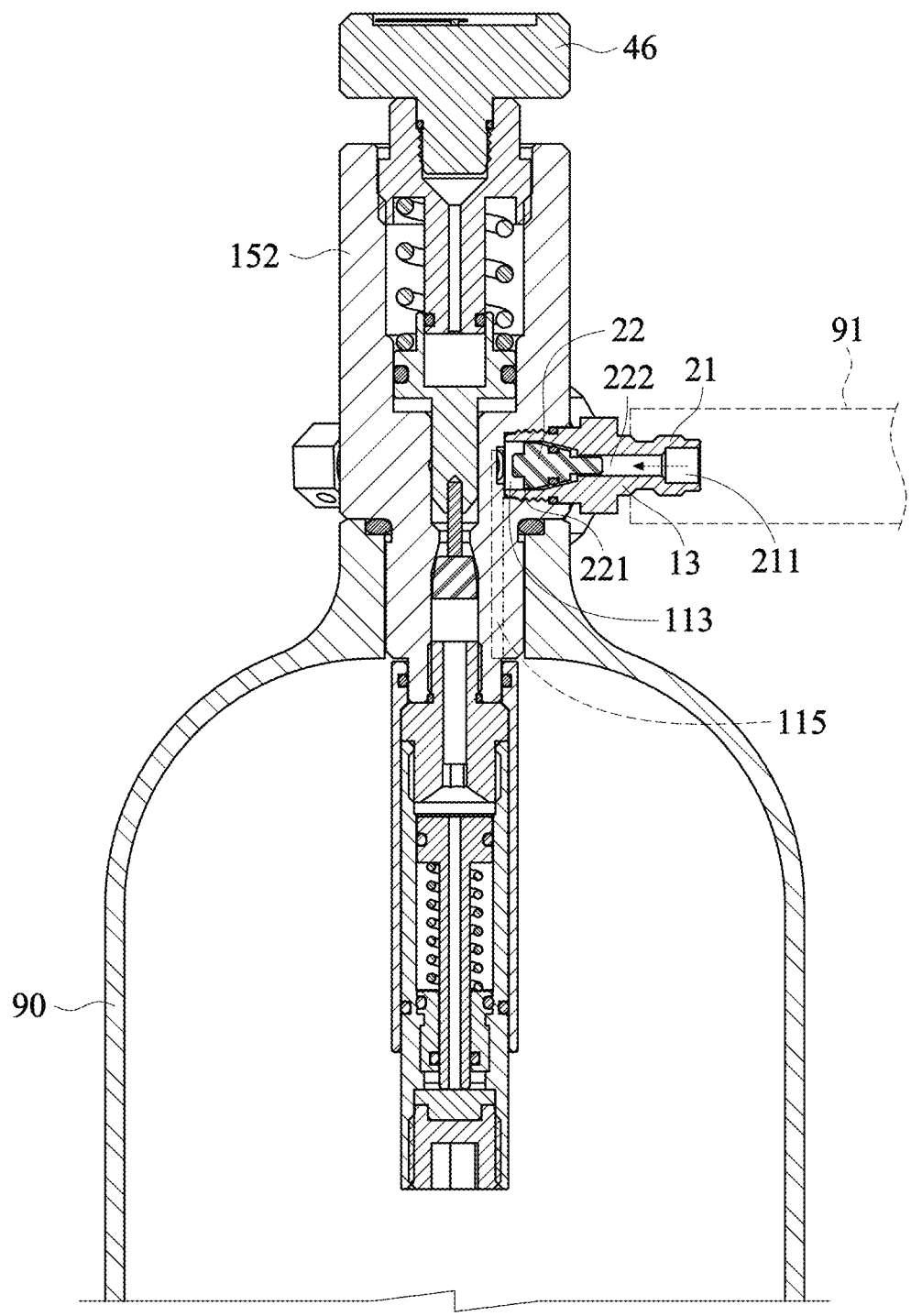
FIG. 12 is a cross sectional view from a fourth lateral side of a gas storage device showing an internal action of the gas storage device in accordance with the present invention.

When the gas-input assembly 20 is not connected to the high-pressure source (as shown in FIG. 11), a gas in the gas storage unit 90 has a gas pressure capable of pushing the gas-input plug 22 into the gas-input channel 115. As a result, the narrower end 222 of the gas-input plug 22 is plugged in the central hole 211 of the gas-input tube 21, the wider end 221 of the gas-input plug 22 closes the central hole 211 of the gas-input tube 21. Then the gas in the gas storage unit 90 does not be leak via the gas-input assembly 20. When the gas-input assembly 20 is connected with the high-pressure source 91 (as shown in FIG. 12), a high-pressure gas from the high-pressure source 91 pushes against the gas-input plug 22 to form a high-pressure gas channel. Consequently, the high-pressure gas from the high-pressure source 91 is injected and stored in the gas storage unit 90 by flowing through the central hole 211 of the gas-input tube 21 into the gas-input channel 115.

Figure 9:
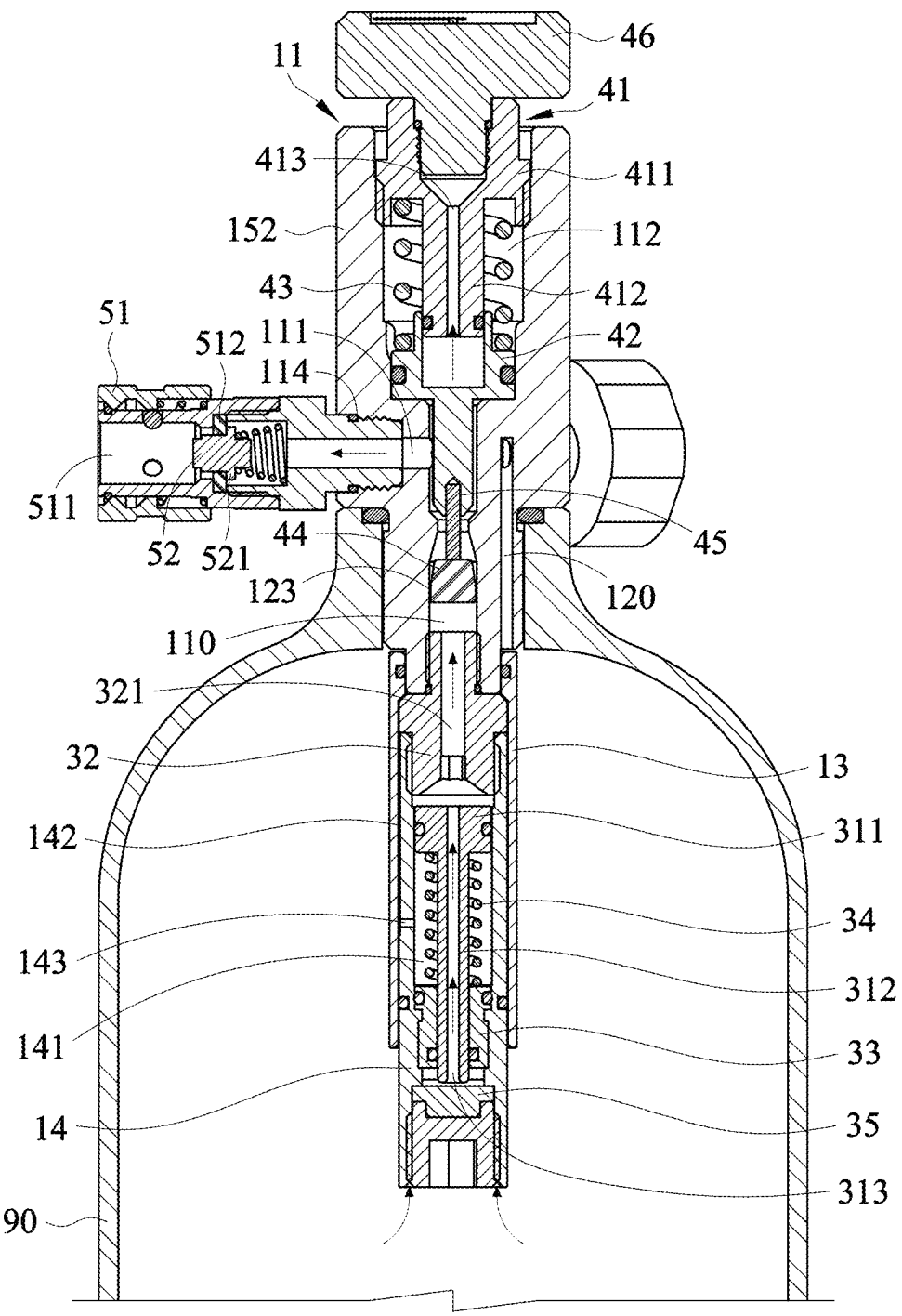
FIG. 9 is a cross sectional view from a second lateral side of a gas storage device showing an internal action of the gas storage device in accordance with the present invention.

With reference to FIG. 4 and FIG. 9, the first regulating assembly 30 is disposed in the first internal tube 13 and the second internal tube 14. The first regulating assembly 30 has a high-pressure piston 31, a high-pressure connection part 32, a high-pressure adjustment part 33, a high-pressure elastic element 34 and a airproof part 35. The high-pressure piston 31 is disposed in the high-pressure piston chamber 141 of the second internal tube 14. The high-pressure piston 31 has an enlarged head 311 and a piston rod 312 where the high-pressure piston 31 has a first high-pressure channel 313 formed by being formed axially through the high-pressure piston 31. The high-pressure connection part 32 has a first end, a second end and a second high-pressure channel 321.

The first end of the high-pressure connection part 32 is mounted in the intermediate chamber 110 of the external tube 11. The second end of the high-pressure connection part 32 is mounted within the first internal tube 13 and the second internal tube 14. The second high-pressure channel 321 is formed axially through the high-pressure connection part 32. The high-pressure adjustment part 33 is mounted within the high-pressure piston chamber 141 of the second internal tube 14 and is mounted outside the piston rod 312. The high-pressure elastic element 34 is mounted outside the piston rod 312 of the high-pressure piston 31. The high-pressure elastic element 34 is clamped between the enlarged head 311 of the high-pressure piston 31 and the high-pressure adjustment part 33. The airproof part 35 is disposed in an end of the second internal tube 14. A top surface of the airproof part 35 is attached to an end of the piston rod 312 so as to selectively close the first high-pressure channel 313 of the high-pressure piston 31.

Figure 13:
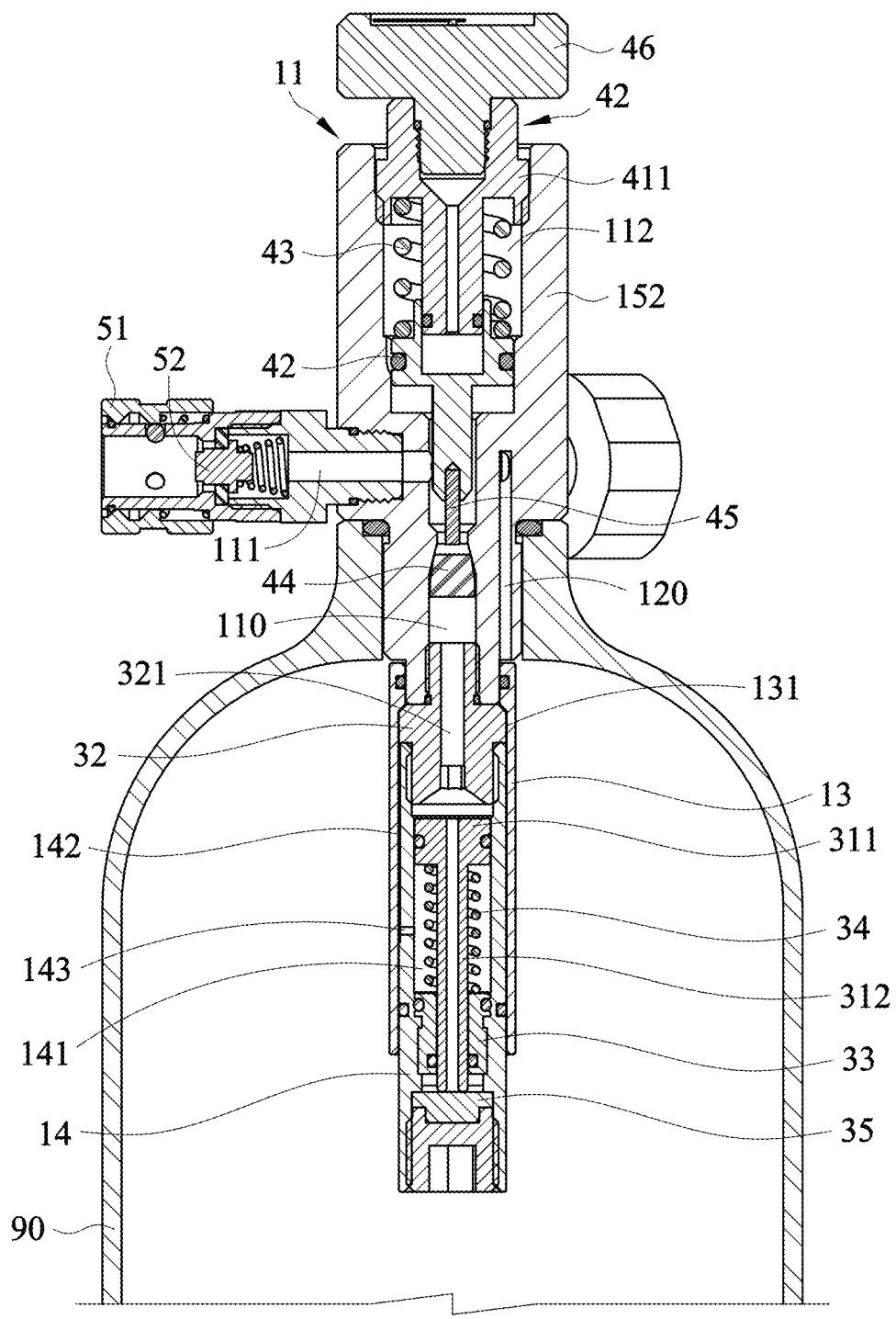
FIG. 13 is a cross sectional view from a fifth lateral side of a gas storage device showing an internal action of the gas storage device in accordance with the present invention.

With reference to FIG. 9, under normal circumstance, the high-pressure elastic element 34 pushes and upholds the high-pressure piston 31 upwardly based on the elasticity of the high-pressure elastic element 34. Therefore, the end of the piston rod 312 of the high-pressure piston 31 is separated from the top surface of the airproof part 35. Then the high-pressure gas from the gas storage unit 90 can flow through the first high-pressure channel 313 of the high-pressure piston 21 and the second high-pressure channel 321 of the high-pressure connection part 32 into the intermediate chamber 110 of the external tube 11. With reference to FIG. 13, when the high-pressure gas flowing into the intermediate chamber 110 has reached to a predetermined value of a gas pressure, the gas pressure in the intermediate chamber 110 is accumulated enough to resist the elasticity of the high-pressure elastic element 34. As a result, the high-pressure piston 31 is pushed downwardly until the end of the piston rod 312 is attached to the top surface of the airproof part 35. In consequence, the continuous flow of the high-pressure gas entering into the high-pressure channel 313 of the high-pressure piston 31 is intercepted. Particularly, when the high-pressure piston 31 within the high-pressure piston chamber 141 initiates a compression stroke to exhaust or supply the high-pressure gas into the high-pressure piston chamber 141, the high-pressure piston chamber 141 communicates with the outside of the gas storage unit 90 throughout the high-pressure exhaustion hole 143 of the second internal tube 14, the elongated groove 142 and the high-pressure exhaustion channel 120 of the external tube 11.

Figure 14:
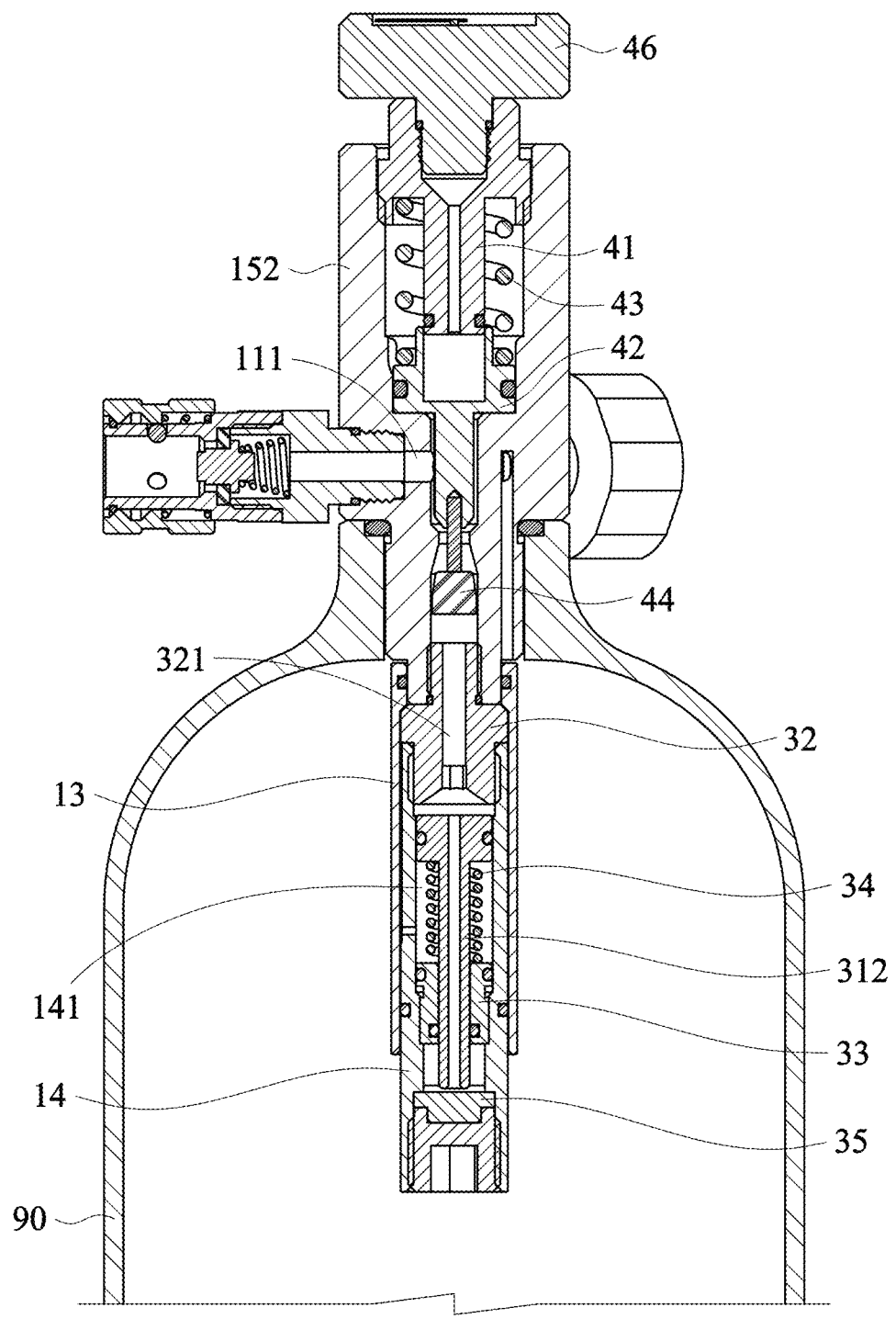
FIG. 14 is a cross sectional view from a sixth lateral side of a gas storage device showing an internal action of the gas storage device in accordance with the present invention.
Figure 15:
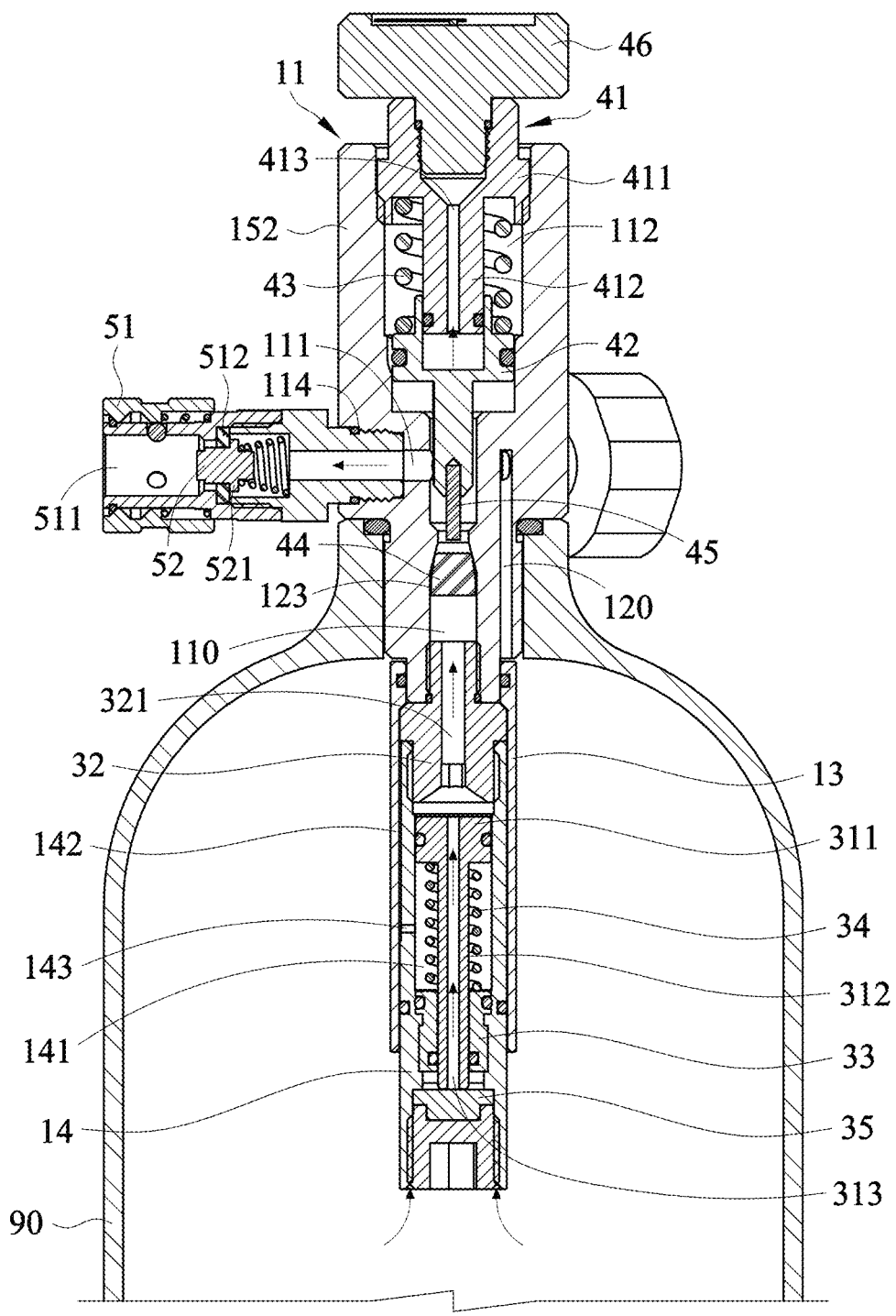
FIG. 15 is a cross sectional view from a seventh lateral side of a gas storage device showing an internal action of the gas storage device in accordance with the present invention.

The predetermined value of the gas pressure in the intermediate chamber 110 may be set by adjusting a position of the high-pressure adjustment part 33. When the high-pressure adjustment part 33 is disposed at a farther position relative to the intermediate chamber 110 (as shown in FIG. 9), the predetermined compression scale required for the high-pressure elastic element 34 becomes smaller. Therefore, once the gas pressure accumulated in the intermediate chamber 110 has achieved a smaller scale of the gas pressure, the high-pressure piston 31 is pushed backwardly and attached to the top surface of the airproof part 35. On the other hand, when the high-pressure adjustment part 33 is disposed at a closer position relative to the intermediate chamber 110 (as shown in FIG. 14), the predetermined compression scale required for the high-pressure elastic element 34 becomes larger. Therefore, the high-pressure piston 31 is not pushed back and attached to the top surface of the airproof part 35 until the gas pressure accumulated in the intermediate chamber 110 has achieved a larger scale of the gas pressure.

Figure 16:
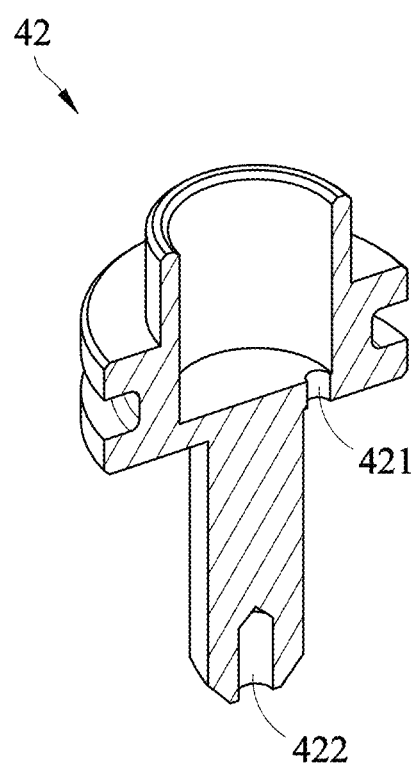
FIG. 16 is a cross sectional perspective view of a low pressure connecting device of a pressure regulator in accordance with the present invention.

With reference to FIG. 9, FIG. 10 and FIG. 16, the second regulating assembly 40 is disposed in the low-pressure section 151 of the external tube 11. The second regulating assembly 40 has a low-pressure piston 41, a low-pressure connection part 42, a low-pressure elastic element 43, a stopper 44 and a bolt 45. The low-pressure piston 41 is disposed in the low-pressure piston chamber 112 of the external tube 11. The low-pressure piston 41 has an enlarged head 411 and a piston rod 412. The low-pressure connection part 42 is mounted in the low-pressure chamber 111 and the low-pressure piston chamber 112. The low-pressure elastic element 43 is mounted outside the piston rod 412 of the low-pressure piston 41. The low-pressure elastic element 43 is clamped between the enlarged head 411 of the low-pressure piston 41 and the low-pressure connection part 42. The stopper 44 is disposed in the intermediate chamber 110 of the external tube 11. The low-pressure connection part 42 and the stopper 44 are fixed with each other. In consequence, the stopper 44 selectively closes the communication between the intermediate chamber 110 and the low-pressure chamber 111. In an embodiment, the intermediate chamber 110 has a conical section 123, which has an interior diameter grown narrower. The conical section 123 has a first end and a second end. The first end disposed adjacent to the high-pressure piston chamber 141 has a wider interior diameter. The second end disposed adjacent to the low-pressure chamber 111 has a narrower interior diameter. The stopper 44 is conical and having a first end with a wider exterior diameter and a second end with a narrower exterior diameter where the first end of the stopper 44 is disposed towards the high-pressure piston chamber 141 and the second end of the stopper 44 is disposed towards the low-pressure chamber 111. The bolt 45 is mounted securely in an end hole 421 of the low-pressure connection part 42 selectively selectively attached to a surface of the stopper 44. Generally, with reference to FIG. 16, under the circumstance that the intermediate chamber 110 has filled with a gas before the low-pressure piston 41 is screwed into the external tube 11, the gas in the intermediate chamber 110 pushes the stopper 44. Meanwhile, the first end with the wider exterior diameter of the stopper 44 would be plugged into the second end with the narrower interior diameter of the conical section 123 of the low-pressure chamber 111 so as to close the communication between the intermediate chamber 110 and the low-pressure chamber 111.

Figure 5:
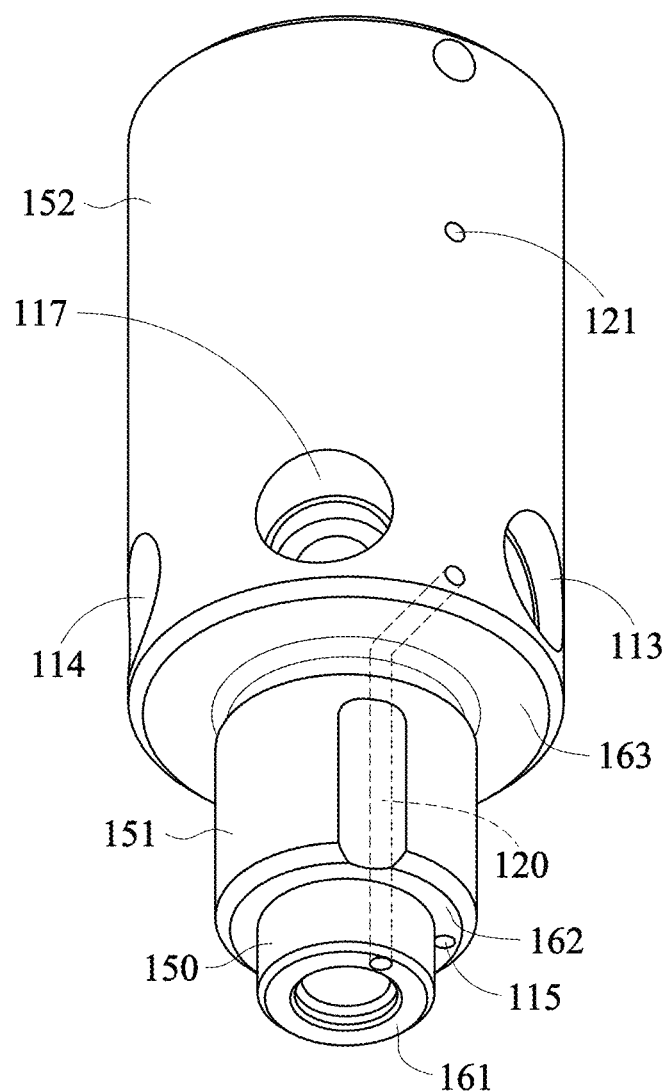
FIG. 5 is a perspective view of an external tube of a pressure regulator in accordance with the present invention.

With reference to FIG. 9, when the low-pressure piston 41 is screwed into the external tube 11, the low-pressure piston 41 compresses the low-pressure elastic element 43. The low-pressure elastic element 43 pushes the low-pressure connection part 42 and the bolt 45 downwardly based on the elasticity of the low-pressure elastic element 43. As a result, the stopper 44 is moved by the push from the bolt 45, such that the second end with the narrower exterior diameter of the stopper 44 is plugged into the first end with the wider interior diameter of the conical section 123 of the low-pressure chamber 111. Therefore, the high-pressure gas in the intermediate chamber 110 flows into the low-pressure chamber 111 throughout a slit formed between the stopper 44 and an internal wall of the intermediate chamber 110. Particularly, when the low-pressure piston 41 within the low-pressure piston chamber 112 initiates a compression stroke to exhaust or supply the gas into the low-pressure piston chamber 112, the low-pressure piston chamber 112 communicates with an outside of the external tube 11 throughout the low-pressure exhaustion channel 121 (as shown in FIG. 5).

The predetermined value of the gas pressure in the low-pressure chamber 111 may be set by adjusting a position of the low-pressure piston 41. When the enlarged head 411 of the low-pressure piston 41 is disposed at a farther position relative to the low-pressure chamber 111 (as shown in FIG. 9), the predetermined compression scale required for the low-pressure elastic element 43 becomes smaller. Therefore, once the gas pressure accumulated in the low-pressure chamber 111 has achieved a smaller scale of the gas pressure, the low-pressure piston 41 is pushed upwardly where the stopper 44 would close the communication between the intermediate chamber 110 and a low-pressure chamber 111. On the other hand, when the enlarged head 411 of the low-pressure piston 41 is disposed at a closer position relative to the low-pressure chamber 111 (as shown in FIG. 14), the predetermined compression scale required for the low-pressure elastic element 43 becomes larger. Therefore, the low-pressure piston 31 is not pushed upwardly, and the communication between the intermediate chamber 110 and the low-pressure chamber 111 is not closed until the gas pressure accumulated in the low-pressure chamber 111 achieves a larger scale of the gas pressure.

Figure 17:
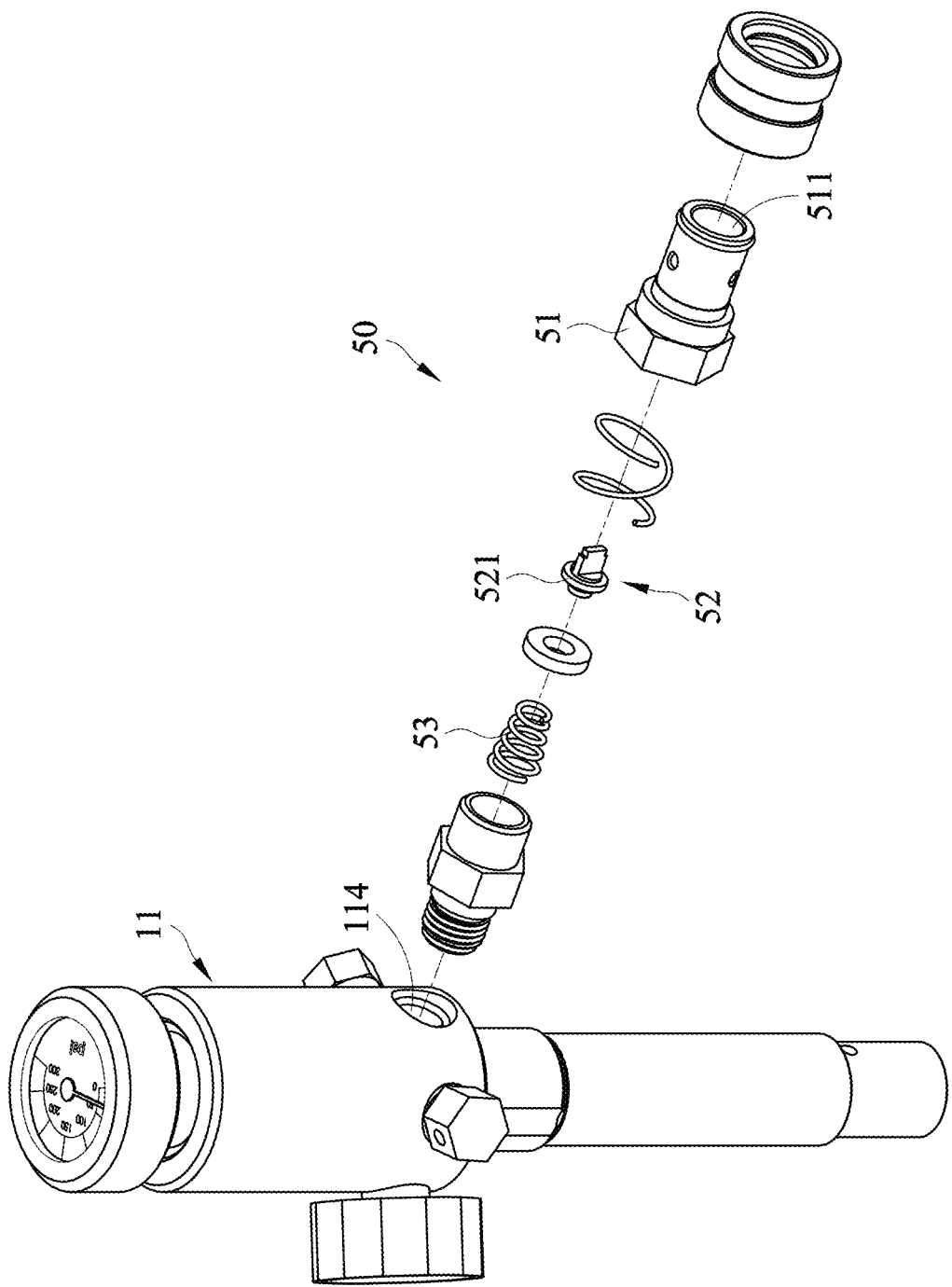
FIG. 17 is an exploded view of the other illustrated part of a pressure regulator in accordance with the present invention.

With reference to FIG. 9 and FIG. 17, the gas-output assembly 50 aforementioned is disposed in the gas outlet orifice 114 of the external tube 11. The gas-output assembly 50 keeps the gas outlet orifice 114 to be closed normally. When an objective device required the use of the compressed gas (such as the air gun or the pneumatic tool) is connected to the gas-output assembly 50, the objective device opens the gas-output assembly 50 to make a gas in the low-pressure chamber 111 to flow into the objective device throughout the gas outlet orifice 114. In an embodiment, the gas-output assembly 50 has a gas-output tube 51 and a gas-output plug 52. The gas-output tube 51 is mounted within the gas outlet orifice 114 and has a central hole 511. The central hole 511 has an internal bump 512 formed transversely within the central hole 511. In an embodiment, the gas-output tube 51 has two pieces and the gas-output plug 52 has a shoulder 521 extending transversely.

Figure 18:
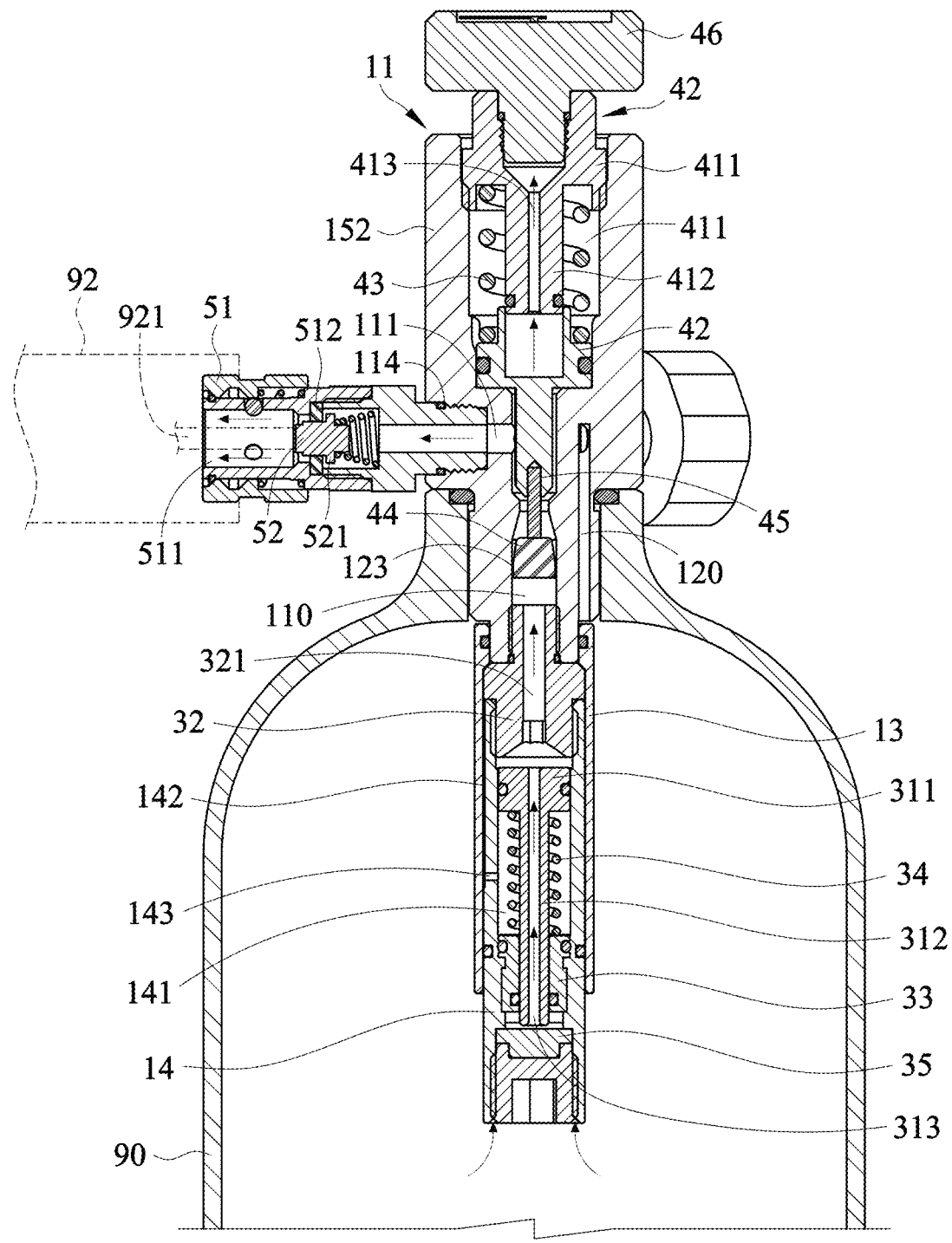
FIG. 18 is a cross sectional view from a seventh lateral side of a gas storage device showing an internal action of the gas storage device in accordance with the present invention.

When the objective device is not connected to the gas-output assembly 50 (as shown in FIG. 9), the gas in the low-pressure chamber 111 has a gas pressure pushing against the gas-output plug 52, so that the shoulder 521 of the gas-output plug 52 attaches to the internal bump 512 of the gas-output tube 51. In consequence, the shoulder 521 of the gas-output plug 52 and the internal bump 512 of the gas-output tube 51 close the central hole 511 of the gas-output tube 51, and the gas in the gas storage unit 90 is not leaked via the gas-output assembly 50. In an embodiment, a return spring 53 is disposed in the gas-output tube 51 and pushes against the shoulder 521 of the gas-output plug 52 to move towards the internal bump 512 of the gas-output tube 51. Therefore, the shoulder 521 of the gas-output plug 52 is surely attached to the internal bump 512 of the gas-output tube 51 so as to efficiently close the central hole 511 of the gas-output tube 51. When the objective device 92 is connected to the gas-output assembly 50 (as shown in FIG. 18), the connecting port 921 of the objective device 92 pushes the gas-output plug 52 away. As a result, the shoulder 521 of the gas-output plug 52 is away from the internal bump 512 of the gas-output tube 51 to form a channel for the gas in the low-pressure chamber 111 flowing through the gas outlet orifice 114 and the central hole 511 of the gas-output tube 51, then entering into the objective device 92 for further application.

With reference to FIG. 1, FIG. 6C and FIG. 10, in an embodiment, a high-pressure gauge is disposed in the test orifice 116. Because the test orifice 116 communicates with the gas inlet orifice 113 throughout a gas-input channel 115, the high-pressure gauge detects the gas pressure in the gas storage unit 90 throughput the test orifice 116 and the gas-input channel 115. As a result, the users recognize the gas pressure in the gas storage unit 90 throughout the high-pressure gauge 122.

With reference to FIG. 3, FIG. 9, FIG. 10, to FIG. 16, in an embodiment, the low-pressure connection part 42 has a through hole 421 formed longitudinally through the low-pressure connection part 42. The low-pressure piston 41 has a low-pressure channel 413 formed axially through the low-pressure piston 41. The low-pressure channel 413 and the low-pressure chamber 111 communicate with each other through the through hole 421. The low-pressure channel 413 has a first opening communicating with the through hole 421 of the low-pressure connection part 42. A second opening of the low-pressure channel 413 communicates with the low-pressure gauge 46. Because the low-pressure channel 413 communicates with the low-pressure chamber 111 via the through hole 421, the low-pressure gauge 46 detects the gas pressure in the low-pressure chamber 111 through the low-pressure channel 413. As a result, the users recognize the current gas pressure in the low-pressure chamber 11, i.e. the gas pressure input to the objective device 92 as well. In addition, the low-pressure gauge 46 is disposed axially and disposed at a top end of the pressure regulator, the users is convenient to directly observe the output value of the gas pressure of the gas in use.

With reference to FIG. 7 and FIG. 13, when the objective device finishes the use of the pressure regulator, considering the overall safety, the low-pressure piston 41 is screwed out of the external tube 11 to exhaust the high-pressure gas in the intermediate chamber 110 and the low-pressure chamber 111. During a process of screwing out the low-pressure piston 41, the force pushing against the low-pressure elastic element 43 is educed when the low-pressure piston 41 moves outwardly. Therefore, the low-pressure connection part 42 is pushed by the gas stored in the low-pressure chamber 111 and moved upward slightly. In consequence, the wall surface of the low-pressure connection part 42 is moved to the groove 125 of the external tube 11. The groove 125 makes that the wall surface of the low-pressure connection part 42 is not attached to the internal surface of the external tube 11. Thus, the gas in the low-pressure chamber 111 flows into the low-pressure piston chamber 112 throughout the groove 125. Meanwhile, the gas flowing into the low-pressure piston chamber 112 is exhausted through the low-pressure exhaustion channel 121 until the gas in the low-pressure chamber is entirely exhausted. Likewise, the gas pressure in the low-pressure chamber 111 is adjusted by screwing the low-pressure piston 41. For example, when the original gas pressure in the low-pressure chamber 111 is 200 psi, but the current demanded gas pressure is 150 psi. The low-pressure gauge 46 is screwed as well as the low-pressure piston 41 to make the wall surface of the low-pressure connection part 42 move to the groove 125 of the external tube 11. Then a few of the gas in the low-pressure chamber 111 is exhausted so as to adjust the gas pressure in the low-pressure chamber 111 to the scale of 150 psi.

With reference to FIG. 1, FIG. 7 and FIG. 10, in an embodiment, a gas releasing assembly 60 is disposed in the gas releasing orifice 119 of the external tube 11. When the gas pressure in the low-pressure chamber 111 is over a predetermined value of safety (for example 200 psi), the gas releasing assembly 60 is used to exhaust a few of the gas in the low-pressure chamber 111 to keep the gas pressure in the low-pressure chamber 111 sustained within the scope of safety. In an embodiment, the gas releasing assembly 60 has a gas releasing tube 61, a gas releasing piston 62 and a gas releasing elastic element 63. The gas releasing tube 61 is mounted in the gas releasing orifice 119 and has a drilled hole 611 formed transversely therethrough. The gas releasing piston 62 is mounted in the gas releasing tube 61, the gas releasing piston 62 selectively selectively closes the communication between the drilled hole 611 of the gas releasing tube 61 and the low-pressure chamber 111. The gas releasing elastic element 63 is clamped between the gas releasing piston 62 and an internal surface of the gas releasing tube 61. The gas releasing piston 62 is pushed towards the low-pressure chamber 111 by the gas releasing elastic element 63 so that the gas releasing piston 62 is attached to a bump formed at the internal surface of the gas releasing tube 61 between the low-pressure chamber 111 and the gas releasing orifice 119. The predetermined value of safety may be decided by the alternatives of the gas releasing elastic element 63. In the normal status, the gas releasing elastic element 63 pushes against the gas releasing piston 62 to move towards the low-pressure chamber 111, from which the gas releasing piston 62 closes the communication between the through hole of the gas releasing tube 61 and the low-pressure chamber 111. When the gas pressure in the low-pressure chamber 111 is over the predetermined value of safety, the gas pressure in the low-pressure chamber 111 is large enough to resist an elastic force from the gas releasing elastic element 63. In consequence, the gas releasing piston 62 is moved across the drilled hole 611 of the gas releasing tube 61 where a slight portion of the gas in the low-pressure chamber 111 is able to leak out through the drilled hole 611. Therefore, the slight adjustment for the gas pressure in the low-pressure chamber 111 would be achieved.

Figure 6A:
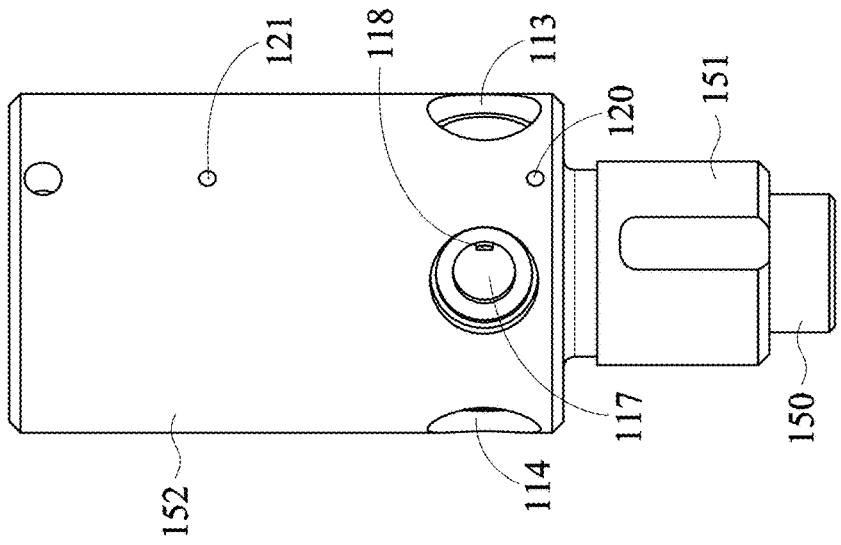
Figure 6E:
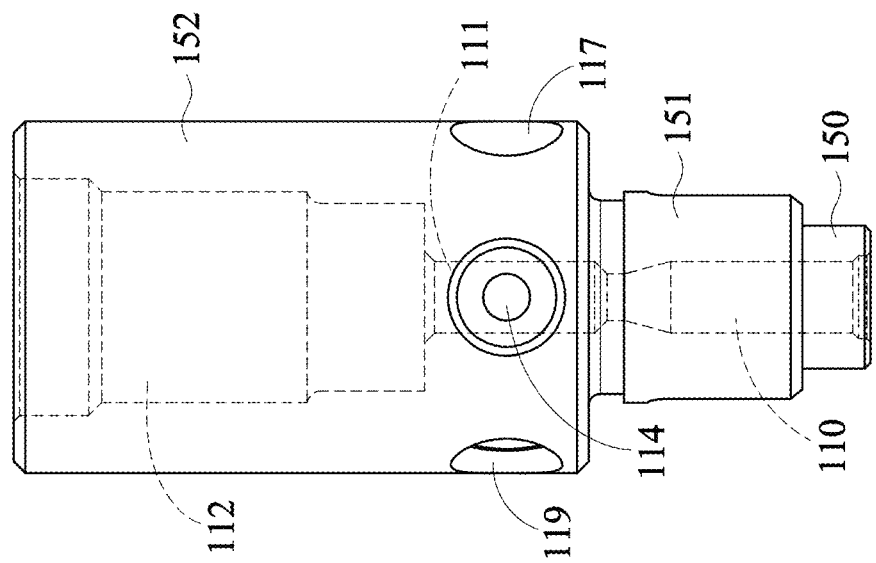
Figure 6D:
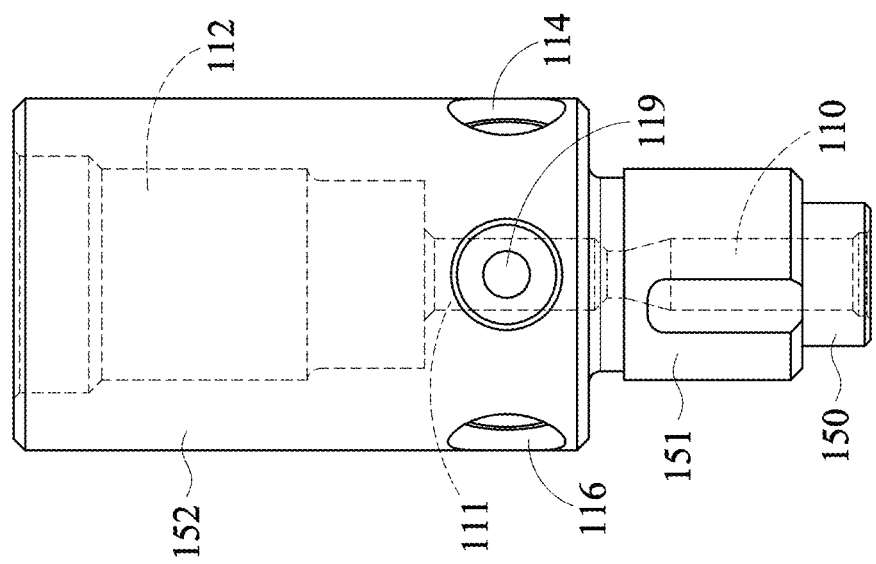

With reference to FIG. 2, FIG. 6A and FIG. 18, in an embodiment, an anti-explosion assembly 70 is disposed in the anti-explosion orifice 117 of the external tube 11. The anti-explosion assembly 70 is provided for keeping the maximum value of the internal gas pressure below a certain scope of safety. Therefore, the risk of damage or even the danger of explosion occurred to the gas storage unit 90 or any other assemblies caused by the over high internal pressure is avoided. Because the anti-explosion channel 118 communicates with the gas inlet orifice 113 throughout the anti-explosion orifice 117, the gas inlet orifice 113 communicates with the gas storage unit 90 throughout the gas-input channel 115. Consequently, once the gas pressure in the gas storage unit 90 has reached to the predetermined value of safety, such as 5000 psi, the anti-explosion assembly 70 would be damaged instantly. Meanwhile, the damage of the anti-explosion assembly 70 makes the anti-explosion orifice 117 communicate with the outside of the gas storage unit 90 right away. Therefore, the gas in the gas storage unit 90 would be completely exhausted throughout the anti-explosion orifice 117, from which the maximum value of the internal gas pressure could be effectively kept below the predetermined value of safety so the use of safety is assured.

Furthermore, the pressure regulator 1 in accordance with the present invention has the airproof rings in the appropriate positions to prevent the occurrence of the gas interference. The following examples are for the illustrations only and constitutes no further restriction. A first airproof ring is mounted around the high-pressure adjustment part 33 to prevent the gas in the gas storage unit 90 from flowing into the high-pressure piston chamber 141. A second airproof ring is mounted around the enlarged head 311 of the high-pressure piston 31 to prevent the gas in the intermediate chamber 110 from flowing into the high-pressure piston chamber 141. A third airproof ring is mounted around a connecting portion between the external tube 11 and the gas storage unit 90 to prevent the high-pressure gas from leaking out through the connecting portion. A fourth airproof ring is mounted around the low-pressure connection part 42 to prevent the gas in the low-pressure chamber 111 from flowing into the low-pressure piston chamber 112.

Furthermore, the high-pressure elastic element 34 and the low-pressure elastic element 43 include any kind of appropriate elastic elements but not limited to the elastic elements such as the spring, the flat spring, the resilient washer and clip etc.

Figure 19:
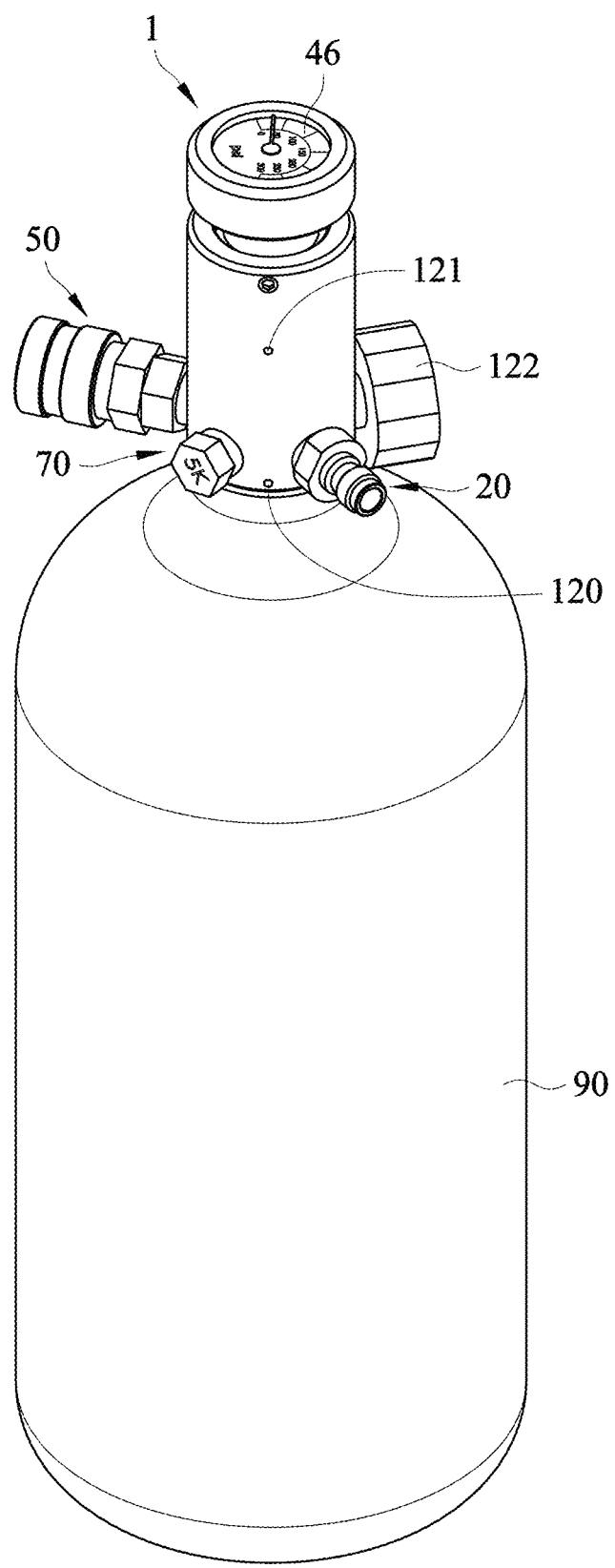
FIG. 19 is a perspective view of a gas storage device in accordance with the present invention.

Generally with reference to FIG. 1 and FIG. 19, the pressure regulator 1 is assembled with the gas storage unit 90 to form a gas storage device in normal application. A portion of the external tube 11, the first internal tube 13 and the second internal tube 14 are inserted in the gas storage unit 90. The other portion of the external tube 11 is disposed outside the gas storage unit 90. Particularly, the high-pressure exhaustion channel 120 of the external tube 11 has a first opening exposed to an outside of the gas storage unit 90. When injecting the high-pressure gas (as shown in FIG. 12), the gas-input assembly 20 is connected to the high-pressure source 91, and the high-pressure gas 91 from the high-pressure source 91 is injected by the gas-input assembly 20 and stored in the gas storage unit 90. In addition, the high-pressure gas in the gas storage unit 90 is reduced to a required scale of the output gas pressure in the low-pressure chamber 111 after the regulation operated by the first regulating assembly 30 and the second regulating assembly 40 (as shown in FIG. 9). For example, the high-pressure gas in the gas storage unit 90 is 2000 psi, the first regulating assembly 30 reduces the value of the gas pressure down to 500 psi at first, and then the second regulating assembly 40 further reduces the value of the gas pressure down to 150 psi for the use in demand. Besides, the two-step pressure regulation decreases the possibility of malfunction or device damage caused by the single-step pressure regulation. When it applied to the objective device 92 (as shown in FIG. 18), the gas-output assembly 50 is connected to the objective device 92, and the gas in the low-pressure chamber 111 having a reduced scale of the required gas pressure would be able to flow through the gas-output assembly 50 into the objective device 92 for further use.

In order to reduce the whole volume of the pressure regulator 1 and the gas storage unit 90, the first internal tube 13 and the second internal tube 14 are inserted inside the gas storage unit 90 in accordance with the present invention. Considering of keeping the normal function of the high-pressure piston chamber 141 inserted inside the gas storage unit 90, when the high-pressure piston 31 initiates a compression stroke in the high-pressure piston chamber 141 axially, it would be necessary for the high-pressure piston chamber 141 to exhaust the gas after the compression and supply the gas after the expansion. However, the high-pressure piston chamber 141 cannot communicate with the gas storage unit 90 internally throughout the opening of the second internal tube 14 directly. In case that the high-pressure gas in the gas storage unit 90 enters into the high-pressure piston chamber 141, it would cause the malfunction or even the damage to the high-pressure piston chamber 141. As a result, the structural collocation of the second internal tube 14 and the external tube 11 makes the high-pressure piston chamber 141 communicate with the outside of the gas storage unit 90 throughout the high-pressure exhaustion channel 120 of the external tube 120. In consequence, the high-pressure piston chamber 141 exhausts the gas to the outside atmosphere throughout the high-pressure exhaustion channel 120 or supply the gas from the outside atmosphere, so that the normal function of the high-pressure piston 31 is maintained and the malfunction of the high-pressure elastic element 34 resulted from the vacuum status of the high-pressure piston chamber 141 due to the shortage of the air could be avoided.

Figure 20:
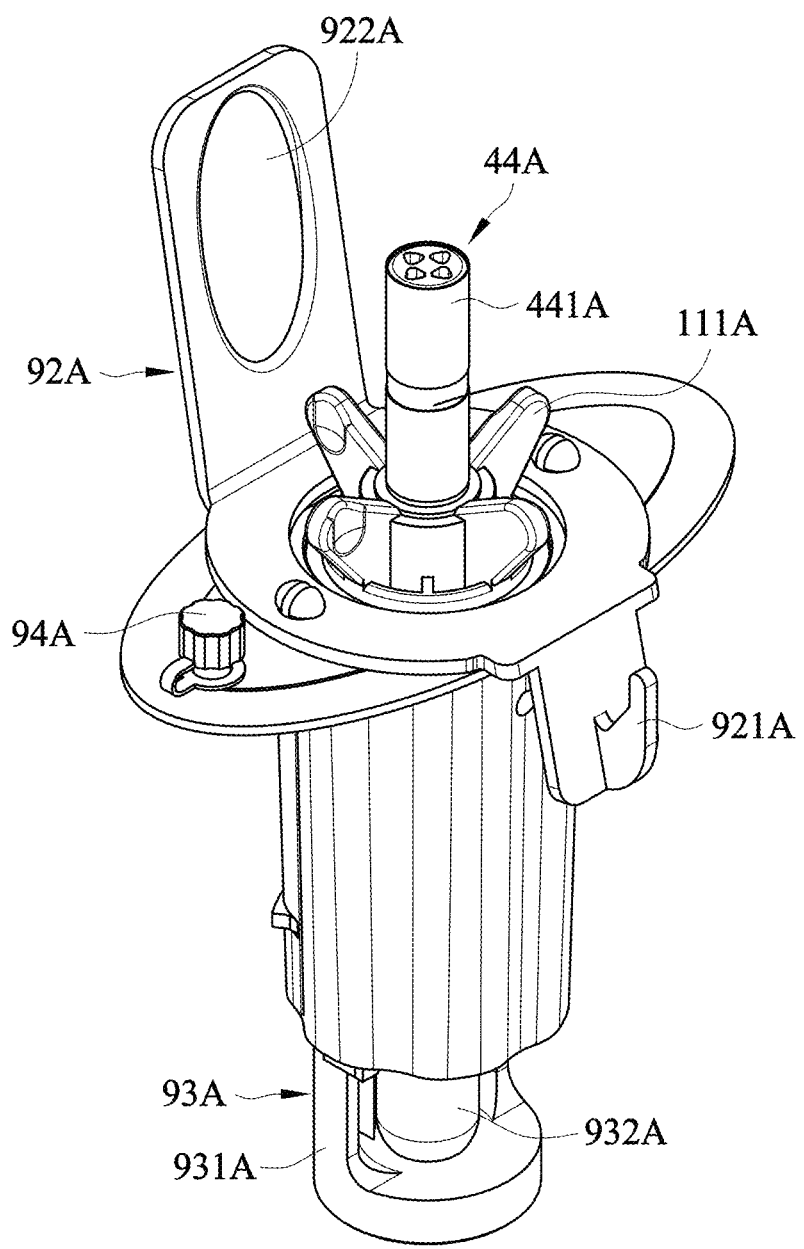
FIG. 20 is a perspective view of another embodiment of a pressure regulatory in accordance with the present invention.
Figure 21:
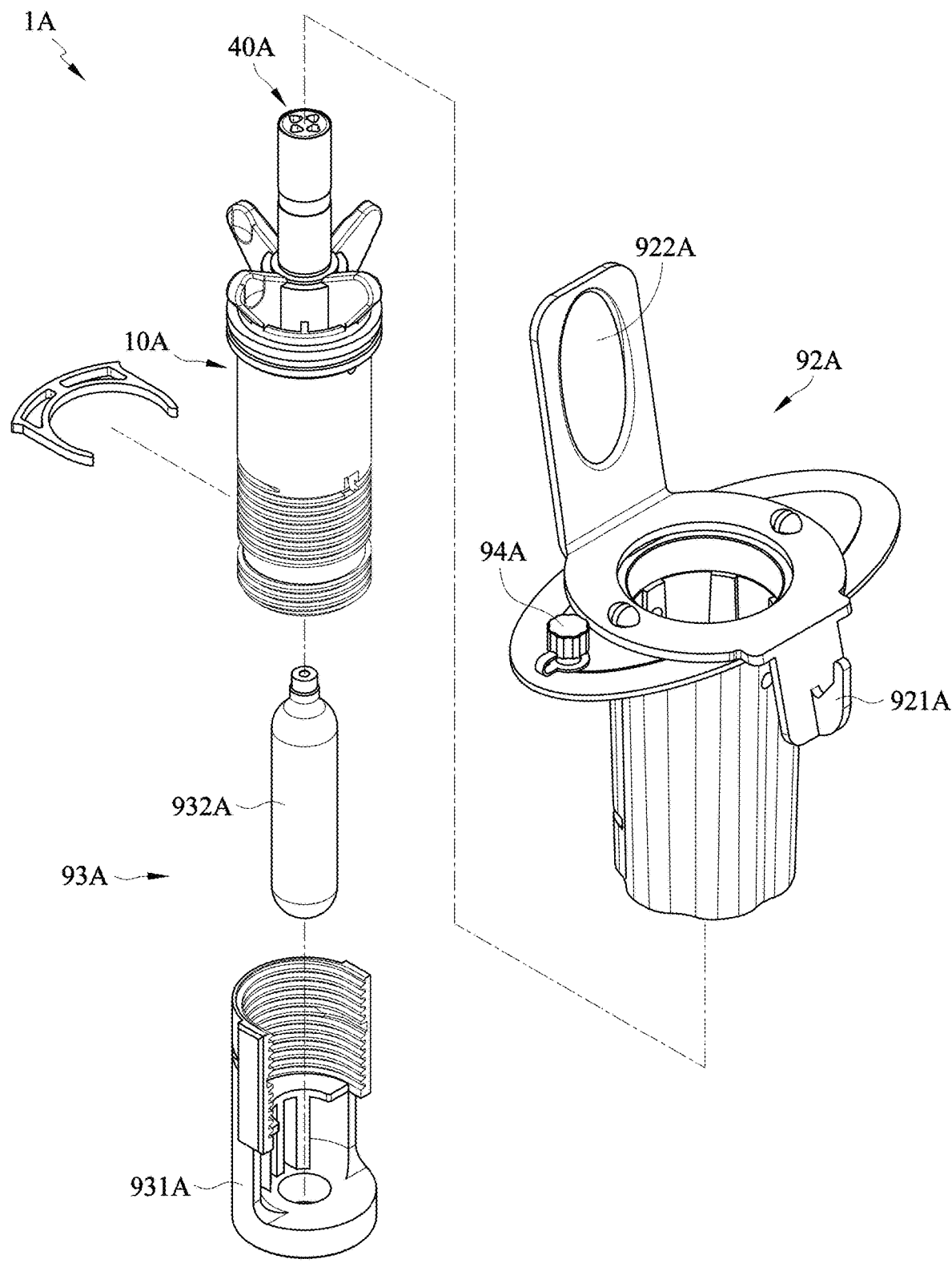
FIG. 21 is an exploded view of an illustrated part of another embodiment of a pressure regulator in accordance with the present invention.
Figure 22:
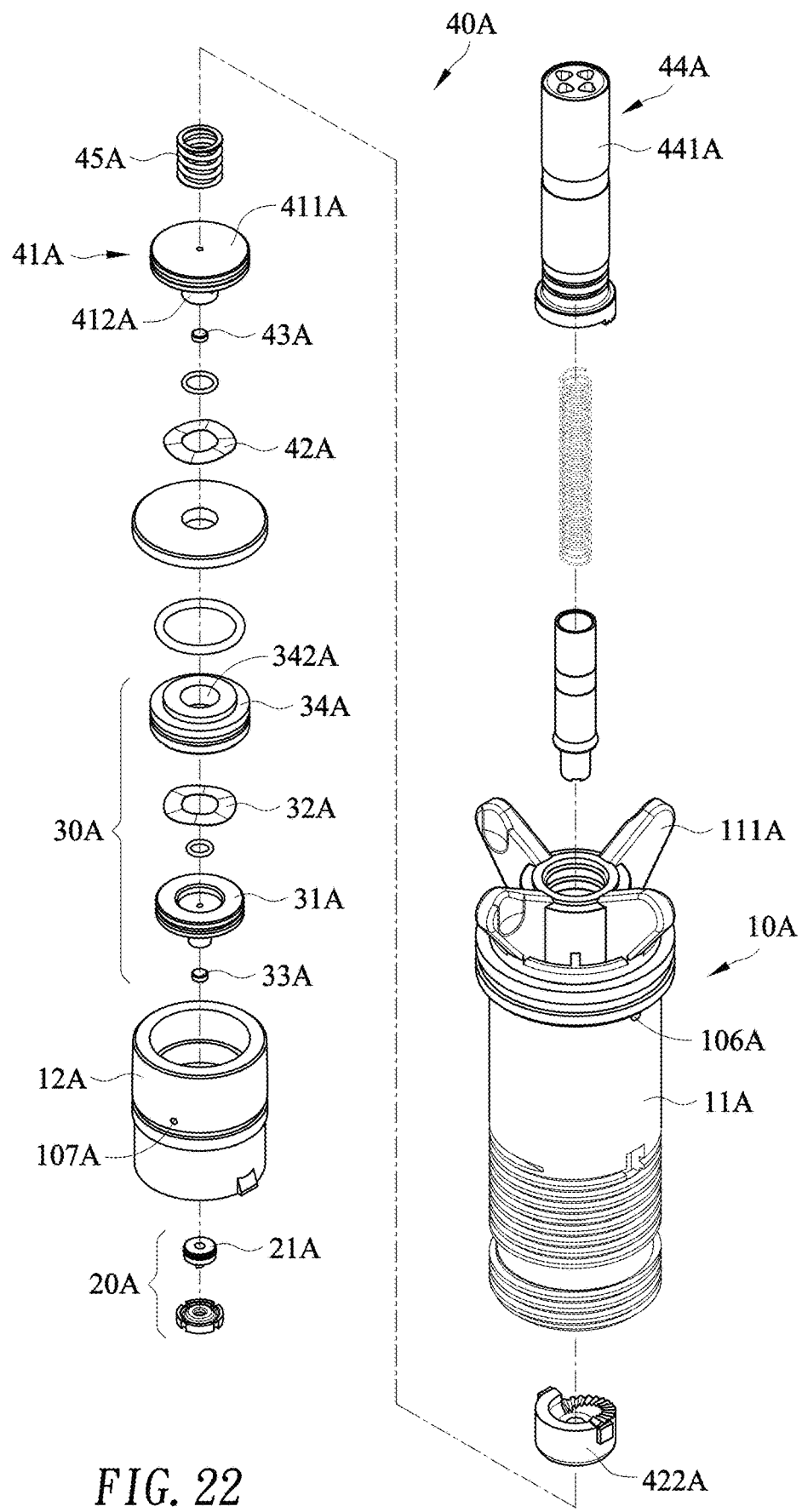
FIG. 22 is a an exploded view of another illustrated part of another embodiment of a pressure regulator in accordance with the present invention.

With reference from FIG. 20 to FIG. 22, in another embodiment in accordance with the present invention, a pressure regulator 1A has a valve assembly 10A, a gas-input assembly 20A, a first regulating assembly 30A and a second regulating assembly 40A.

With reference from FIG. 21 to FIG. 25, the valve assembly 10A has an axial channel which has a gas inlet orifice 101A, a high-pressure piston chamber 102A, an intermediate chamber 103A, a low-pressure piston chamber 104A, a low-pressure chamber 105A and a gas outlet orifice 106A in sequence. The gas inlet orifice 101A selectively communicates with the intermediate chamber 103A, the intermediate chamber 103A selectively communicates with the low-pressure chamber 105A, the gas outlet orifice 106A selectively communicates with the low-pressure chamber 105A. In an embodiment, the valve assembly 10A has an external tube 11A and an internal tube 12A, the internal tube 12A is mounted in the external tube 11A. The gas inlet orifice 101A, the high-pressure piston chamber 102A and the intermediate chamber 103A are disposed axially in the internal tube 12A sequentially. The gas inlet orifice 101A is disposed at an end of the internal tube 12A. The low-pressure piston chamber 104A and the low-pressure chamber 105A are disposed in the external tube 11A and disposed corresponding to a top end of the internal tube 12A. The gas outlet orifice 106A is formed transversely through the external tube 11A. The valve assembly 10A has a high-pressure exhaustion channel communicating with the high-pressure piston chamber 102A and an outside of the valve assembly 10A. The high-pressure exhaustion channel has a radial section 107A and an axial opening 108A where The radial section 107A communicates with the high-pressure piston chamber 102A, the axial opening 108A is formed through the valve assembly 10A. The high-pressure piston chamber 102A communicates with the outside of the valve assembly 10A throughout the high-pressure exhaustion channel. In an embodiment, the external tube 10A has a top end formed as a hand-holding part 111A extending transversely, which is convenient for the users to turn the external tube 10A by holding the hand-holding part 111A.

Figure 23:
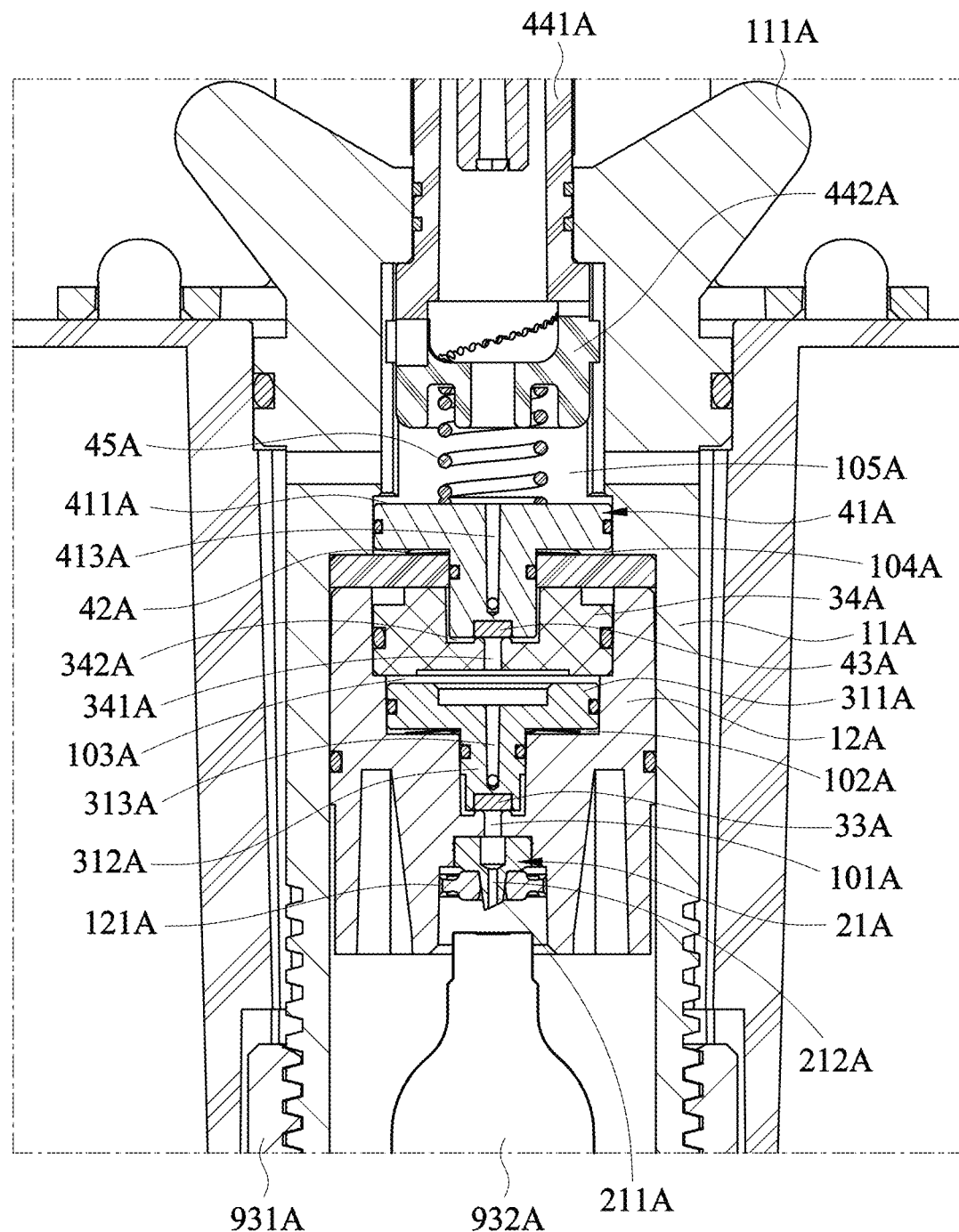
FIG. 23 is a cross sectional view from a first lateral side of another embodiment of a gas storage device showing an internal action of the gas storage device in accordance with the present invention.
Figure 24:
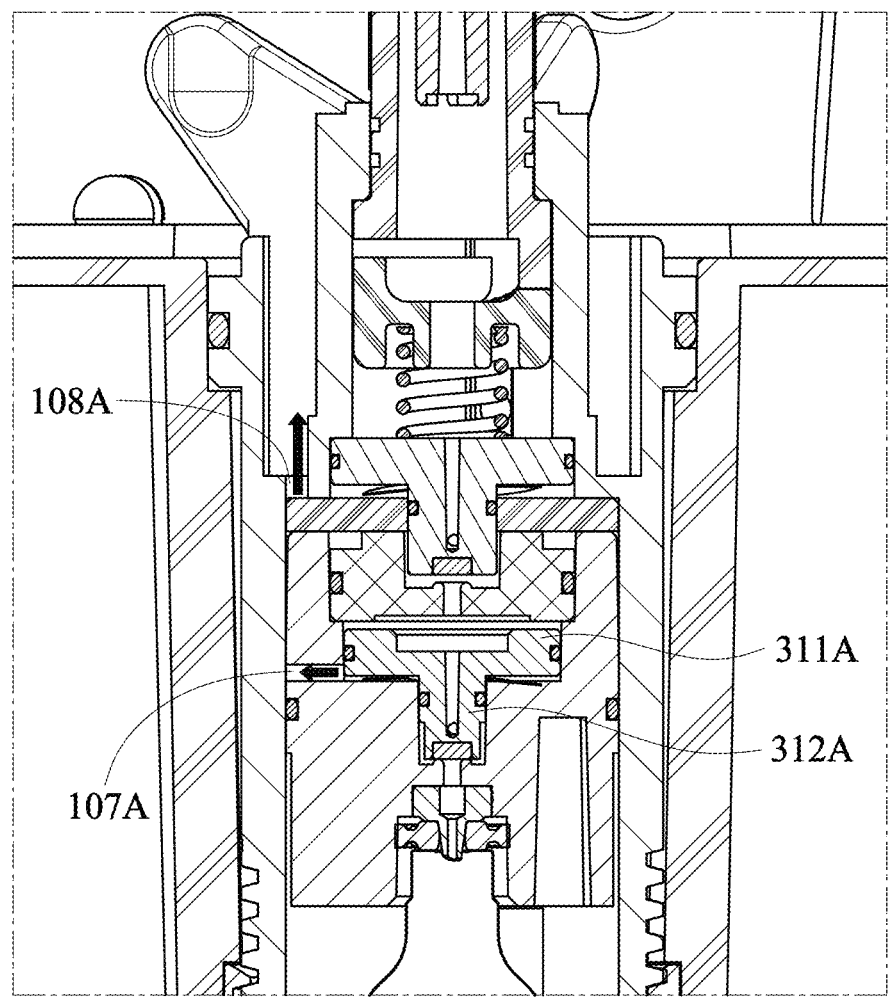
FIG. 24 is a cross sectional view from a second lateral side of another embodiment of a gas storage device showing an internal action of the gas storage device in accordance with the present invention.
Figure 25:
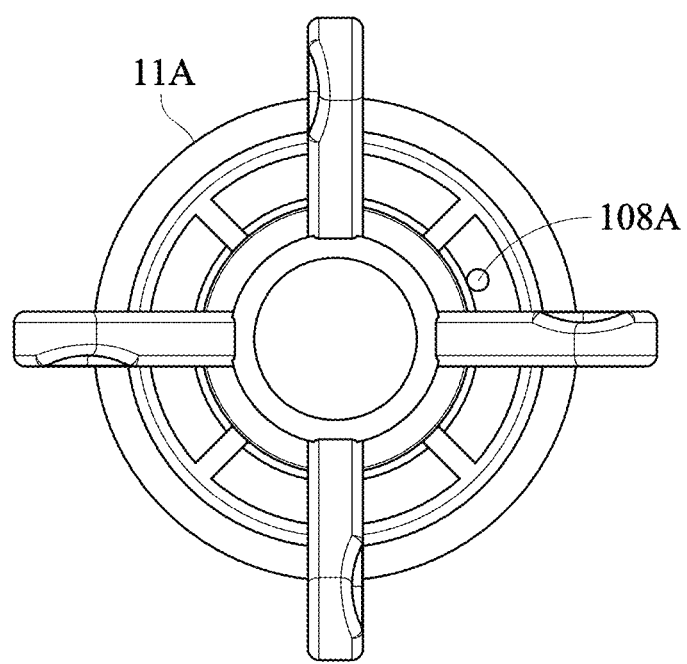
FIG. 25 is a top view of another embodiment of an external tube in accordance with the present invention.
Figure 26:
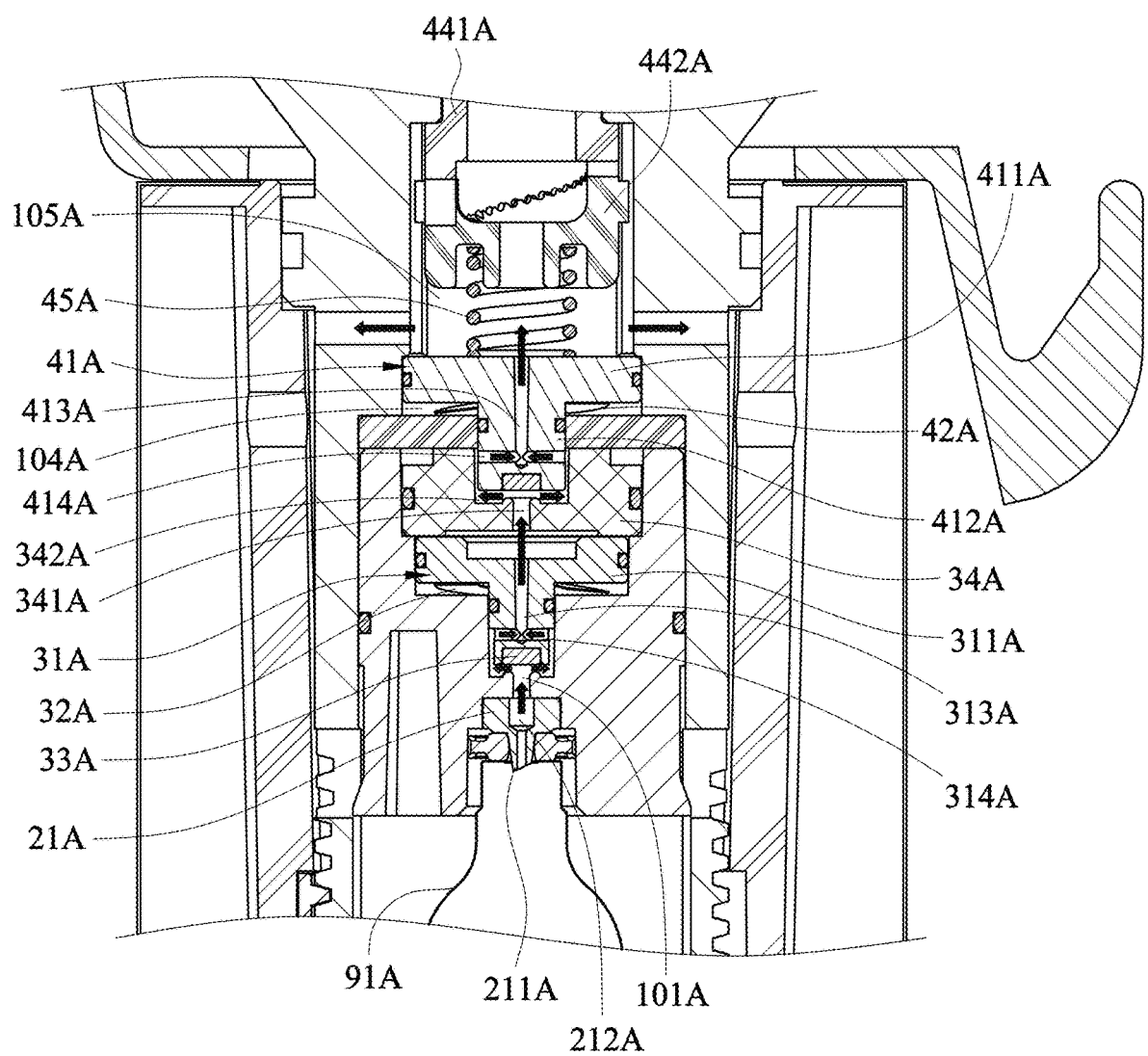
FIG. 26 is a cross sectional view from a third lateral side of another embodiment of a gas storage device showing an internal action of the gas storage device in accordance with the present invention.

With reference to FIG. 22 and FIG. 23, the gas-input assembly 20A is disposed in the valve assembly 10A and communicates with the gas inlet orifice 101A. In an embodiment, the internal tube 12A has a bottom end where a chamber 121A is formed inwardly. The chamber 121A communicates with the gas inlet orifice 101A. The gas-input assembly 20A is disposed in the chamber 121A and has a puncturing unit 21A. The puncturing unit 21A is hollow and has a sharp end 211A and an internal channel 212A where the internal channel 212A has an opening at each of the both ends and communicates with the gas inlet orifice 101A. With reference to FIG. 26, when the sharp end 211A penetrates through a high-pressure gas bottle 91A, the high-pressure gas in the high-pressure gas bottle 91A flows into the internal channel 212A of the puncturing unit 21A and further flows into the gas inlet orifice 101A.

Figure 27:
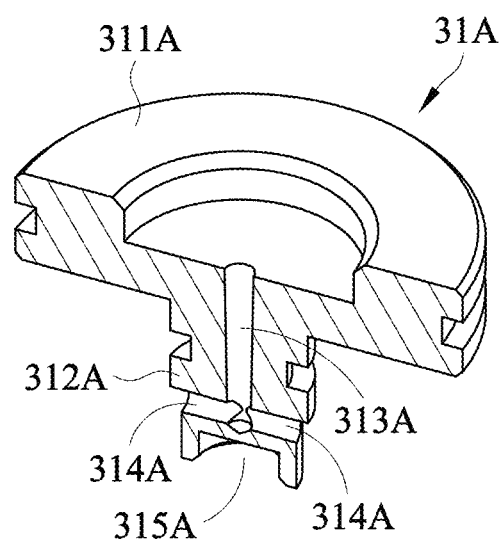
FIG. 27 is a cross sectional perspective view of another embodiment of a high-pressure piston in accordance with the present invention.

With reference to FIG. 22, FIG. 23 and FIG. 27, the first regulating assembly 30A is disposed in the high-pressure piston chamber 102A and the intermediate chamber 103A of the valve assembly 10A. A gas flowing through the first regulating assembly 30A has a first gas pressure and the first regulating assembly 30A inducts the gas into the intermediate chamber 103A after reducing the first gas pressure. In an embodiment, the first regulating assembly 30A has a high-pressure piston 31A, a high-pressure elastic element 32A, a high-pressure airproof part 33A, and a high-pressure connection part 34A. The high-pressure piston 31A is disposed in the high-pressure piston chamber 102A of the internal tube 12A. The high-pressure piston chamber 102A has a stepped part 109A formed therein. The high-pressure piston 31A has an enlarged head 311A and a piston rod 312A where a high-pressure channel 313A is formed axially through the high-pressure piston 31A. The high-pressure channel 313A selectively communicates with the gas inlet orifice 101A. The piston rod 312A has a lateral side having at least one through hole 314A formed transversely through the piston rod 312A, so that the gas is capable of flowing into the high-pressure channel 313A via the through hole 314A. The high-pressure elastic element 32A is mounted around the piston rod 312A and is clamped between the enlarged head 311A of the high-pressure piston 31A and the stepped part 109A of the high-pressure piston chamber 102A. The high-pressure airproof part 33A is attached to an end of the piston rod 312A of the high-pressure piston 31A so as to selectively close the communication between the high-pressure channel 313A and the gas-inlet orifice 101A. In an embodiment, the piston rod 312A of the high-pressure piston 31A has an end where a recess 315A is formed inwardly and adapted for the high-pressure airproof part 33A. The high-pressure airproof part 33A is inserted inside the recess 315A of the piston rod 312A of the high-pressure piston 31A. The high-pressure connection part 34A disposed in the intermediate chamber 103A has a first end disposed next to the enlarged head 311A of the high-pressure piston 31A. The high-pressure connection part 34A has an intermediate channel 341A formed axially through the high-pressure connection part 34A. The intermediate channel 341A communicates with the high-pressure channel 313A of the high-pressure piston 31A. The high-pressure connection part 34A has a second end where a connecting detent 342A is formed thereon.

Figure 28:
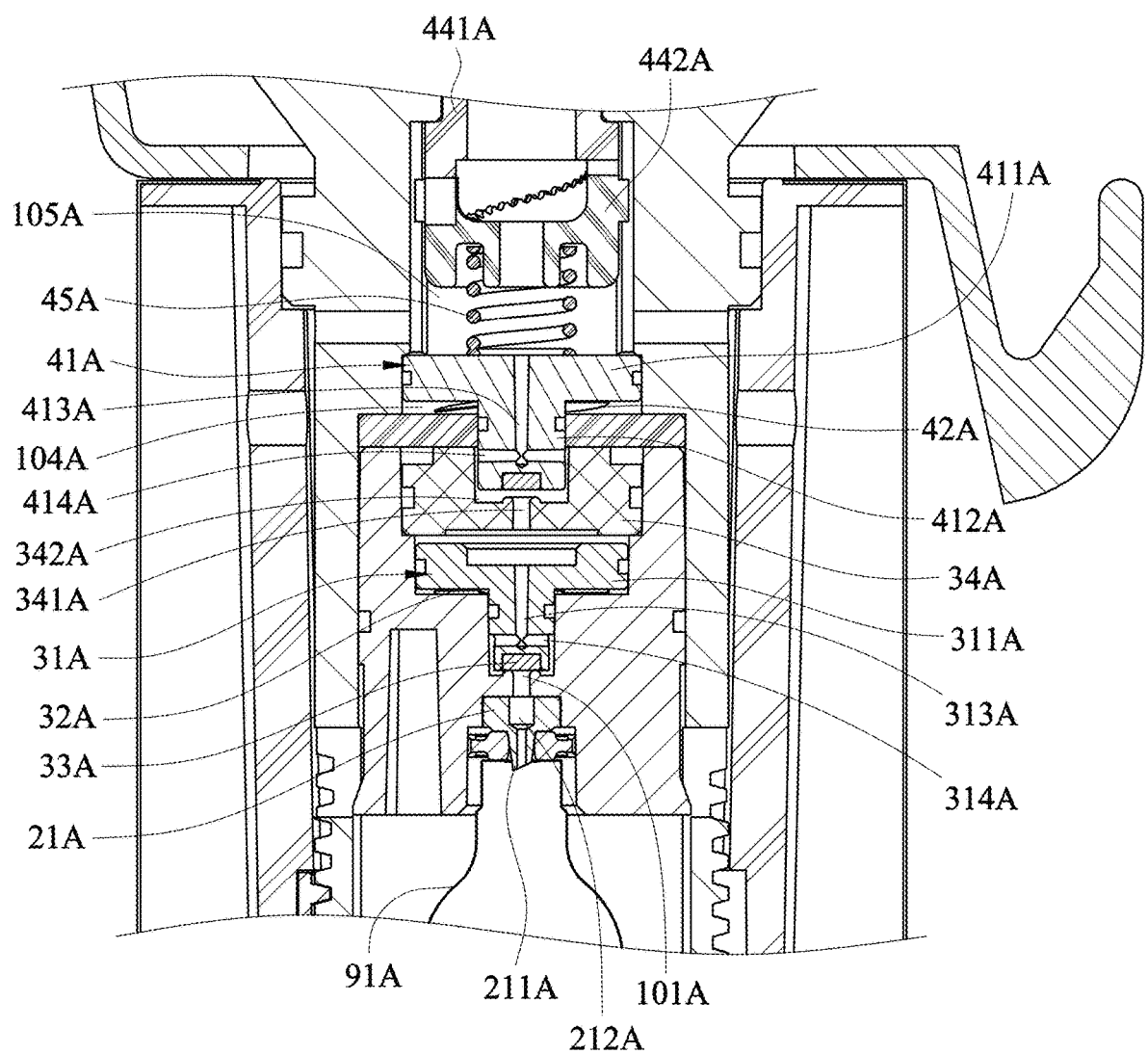
FIG. 28 is a cross sectional view from a fourth lateral side of another embodiment of a gas storage device showing an internal action of the gas storage device in accordance with the present invention.

With reference to FIG. 23, in normal condition, the high-pressure airproof part 33A is attached to an end of the piston rod 312A of the high-pressure piston 31A so as to selectively close the communication between the high-pressure channel 313A and the gas-inlet orifice 101A. With reference to FIG. 26, when the high-pressure gas flows through the gas-inlet orifice 101A, the high-pressure gas pushes the high-pressure airproof part 33A to push the high-pressure piston 31A to move axially. In consequence, the high-pressure airproof part 331A is pushed away from the gas-inlet orifice 101A of the valve assembly 10A. Therefore, the high-pressure gas is capable of entering into the through hole 314A of the high-pressure piston 31A and the high-pressure channel 313A, finally flowing into the intermediate channel 341A in sequence. With reference to FIG. 28, when the high-pressure gas flowing into the intermediate chamber 341A has reached to a predetermined value, the gas pressure of the high-pressure gas in the intermediate channel 341A is higher than a total pressure accumulated from the high-pressure elastic element 32A and a gas pressure resulted from the gas entering into the gas inlet orifice 101A. Then, the high-pressure piston 31A is pushed back to the original position by the high-pressure gas in the intermediate channel 341A. Consequentially, the high-pressure airproof part 33A closes the gas inlet orifice 101A again. When the gas pressure in the intermediate chamber 103A is reduced to a scale that the returned elasticity of the high-pressure elastic element in addition to the gas pressure resulted from the gas entering into the gas inlet orifice 101A is enough to resist a reduced gas pressure in the intermediate chamber 103A, the high-pressure elastic element 32A pushes the high-pressure piston 31A backward to the status shown in FIG. 26. As a result, the high-pressure gas is capable of flowing through the high-pressure channel 313A into the intermediate chamber 103A again. In sum, the predetermined value of the gas pressure allowable for flowing through the high-pressure channel 313A may be adjusted by the coefficient of elasticity of the high-pressure elastic element 32A so as to achieve the objective of reducing the gas pressure at the first level.

Figure 29:
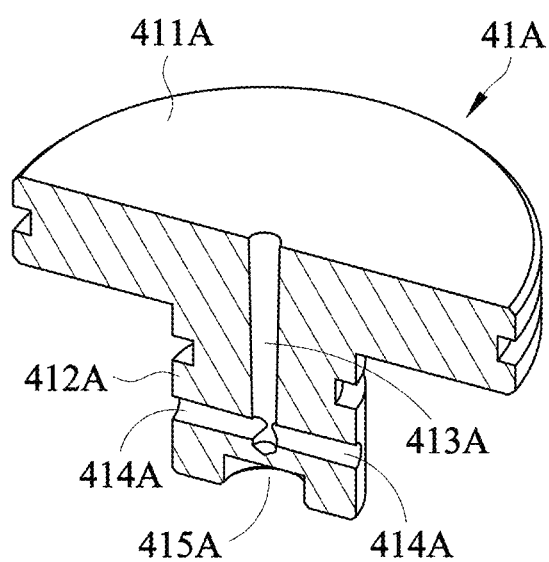
FIG. 29 is a cross sectional perspective view of another embodiment of a low-pressure piston in accordance with the present invention.

With reference to FIG. 22, FIG. 23 and FIG. 29, the second regulating assembly 40A aforementioned is disposed in the low-pressure piston chamber 104A and the low-pressure chamber 105A of the valve assembly 10A where the intermediate chamber 103A selectively communicates with the low-pressure chamber 105A. In an embodiment, the second regulating assembly 40A has a low-pressure piston 41A, a first low-pressure elastic element 42A, a low-pressure airproof part 43A, a regulating assembly 44A and a second low-pressure elastic element 45A. The low-pressure piston 41A is disposed in the low-pressure piston chamber 104A and disposed adjacent to the high-pressure connection part 34A. In an embodiment, the low-pressure piston 41A has an enlarged head 411A and a piston rod 412A where a low-pressure channel 413A is formed axially through. The low-pressure channel 413A selectively communicates with the intermediate channel 341A of the high-pressure connection part 34A. The piston rod 412A has a lateral side having at least one through hole 414A formed transversely through the piston rod 412A, so that the gas is able to flow into the low-pressure channel 413A via the through hole 414A. In an embodiment, the piston rod 412A of the low-pressure piston 41A is mounted in the connecting detent 342A of the high-pressure connection part 34A. The first low-pressure elastic element 42A mounted outside the piston rod 412A of the low-pressure piston 41A is disposed in the low-pressure piston chamber 104A, and is clamped between the enlarged head 411A of the low-pressure piston 41A and the high-pressure connection part 34A. In an embodiment, a gasket 46A is disposed between the high-pressure connection part 34A and the first low-pressure elastic element 42A. The low-pressure airproof part 43A is attached to an end of the piston rod 412A of the low-pressure piston 41A so as to selectively close the communication between the low-pressure channel 413A and the intermediate channel 341A. In an embodiment, the piston rod 412A of the low-pressure piston 41A has an end where a recess 415A is formed inwardly and adapted for the low-pressure airproof part 43A. The low-pressure airproof part 43A is inserted inside the recess 415A of the piston rod 412A of the low-pressure piston 41A. The regulating assembly 44A is disposed in the low-pressure chamber 105A and protrudes out of a top end of the external tube 11A. The second low-pressure elastic element 45A is clamped between the regulating assembly 44A and the enlarged head 411A of the low-pressure piston 41A, so that an adjustment for the regulating assembly 44A is capable of changing a compression scale of the second low-pressure elastic element 45A. In consequence, the adjustment for the returned elasticity preliminarily stored by the second low-pressure elastic element 45A is able to influence the action of the low-pressure piston 41A and further changes the air pressure in the low-pressure chamber 105A.

Figure 30:
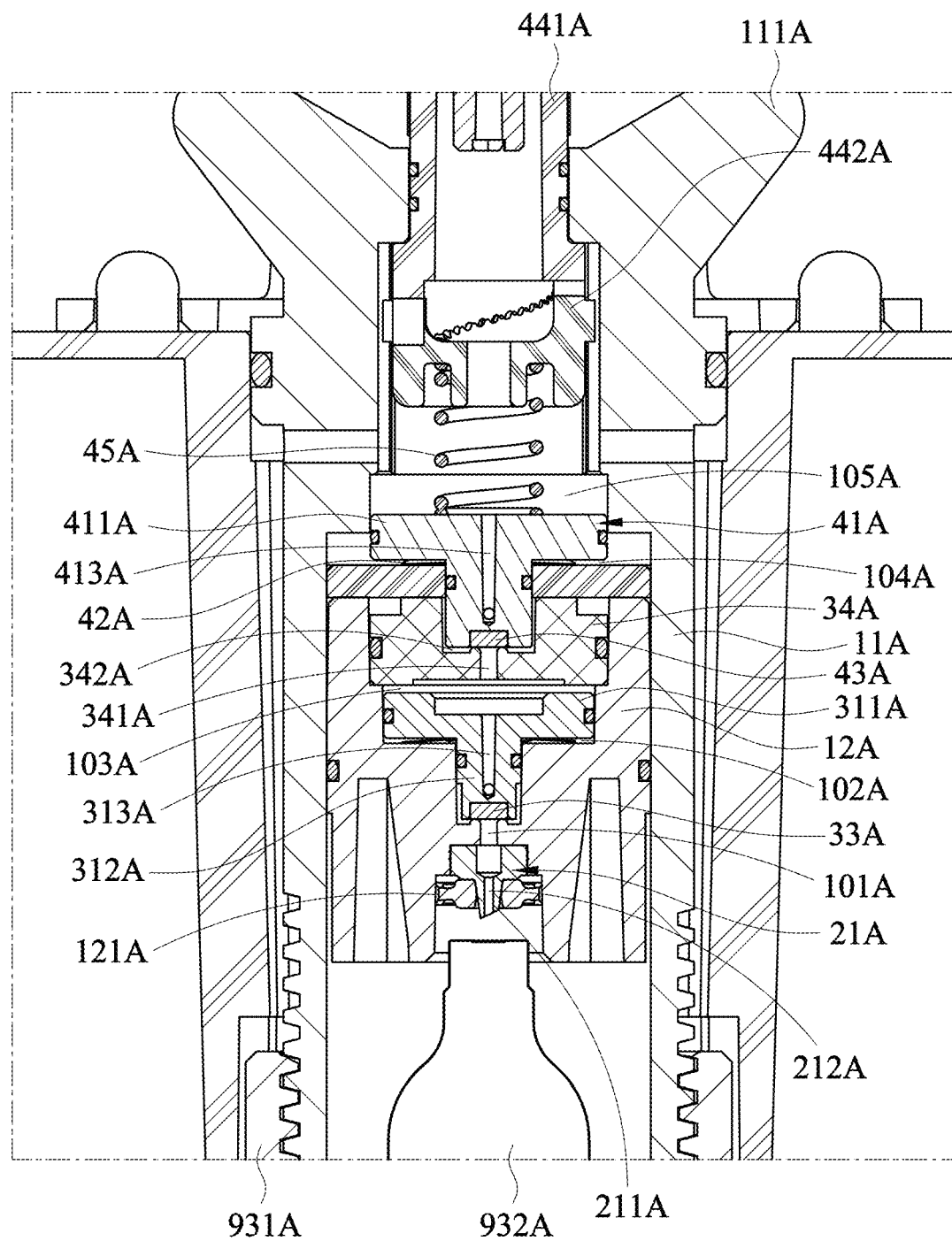
FIG. 30 is a cross sectional view from a fifth lateral side of another embodiment of a gas storage device showing an internal action of the gas storage device in accordance with the present invention.

In an embodiment, with reference to FIG. 22, FIG. 23 and FIG. 30, the regulating assembly 44A has an actuator 441A and a driven element 442A. The actuator 441A is attached to the driven element 442A rotatably, and the second low-pressure elastic element 45A is clamped between the driven element 442A and the enlarged head 411A of the low-pressure piston 41A. The actuator 441A has a first inclined surface corresponds to a second inclined surface of the driven element 442A. The first inclined surface of the actuator 441A is capable of pushing the driven element 442A to move axially when the actuator 441A rotates relative to the driven element 442A. In consequence, the compression scale of the second low-pressure elastic element 45A may be adjusted. In an embodiment, each of the first inclined surface of the actuator 441A and the second inclined surface of the driven element 442A has a plurality of teeth engaged with each other. With reference to FIG. 23, when the second low-pressure elastic element 45A has a larger scale of the compression that produces a larger amount of the elastic force pushing against the low-pressure piston 41, it would require a larger gas pressure from the intermediate channel 341A to push the low-pressure airproof part 43A away. Therefore, the gas pressure in the low-pressure chamber 105A input from the intermediate channel 341A is larger and adapted for the application that requires the larger gas pressure. With reference to FIG. 30, when the second low-pressure elastic element 45A has a smaller scale of the compression that produces a smaller amount of the elastic force pushing against the low-pressure piston 41, a smaller gas pressure from the intermediate channel 341A is enough to push the low-pressure airproof part 43A away. Therefore, the gas pressure in the low-pressure chamber 105A input from the intermediate channel 341A is be smaller and adapted for the application that requires the smaller gas pressure.

Figure 31:
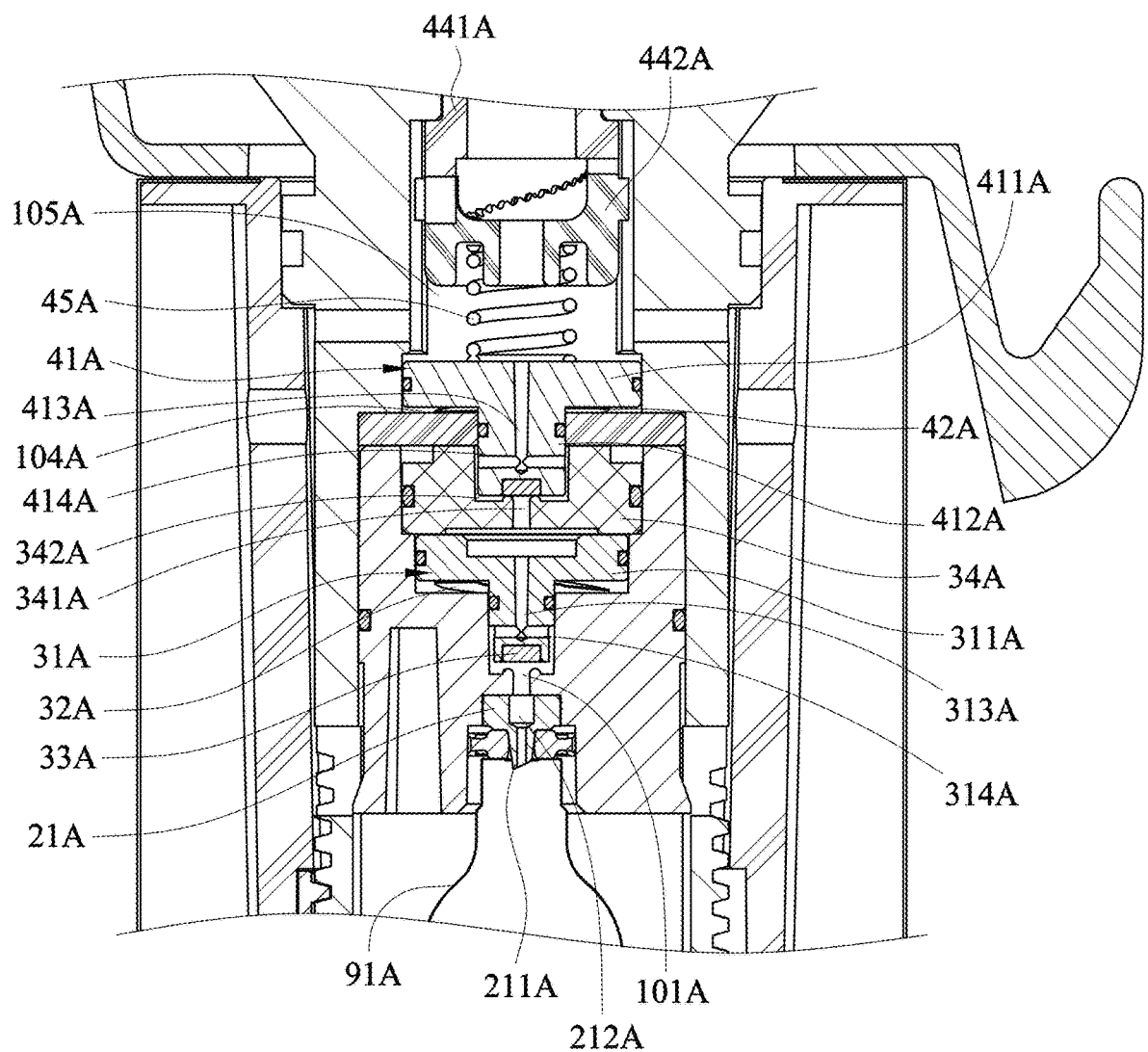
FIG. 31 is a cross sectional view from a sixth lateral side of another embodiment of a gas storage device showing an internal action of the gas storage device in accordance with the present invention.

With reference to FIG. 23, in normal condition, the low-pressure airproof part 43A is attached to an end of the piston rod 412A of the low-pressure piston 41A so as to selectively close the communication between the low-pressure channel 413A and the intermediate chamber 103A. With reference to FIG. 26, when the high-pressure gas flows into the intermediate chamber 103A, the high-pressure gas pushes the low-pressure airproof part 43A to push the low-pressure piston 41A to move axially. In consequence, the low-pressure airproof part 43A is moved away from an opening of the intermediate channel 341A of the high-pressure connection part 34A. Therefore, the gas after the first level of the gas pressure reduction is capable of entering into the through hole 414A of the low-pressure piston 41A and the low-pressure channel 413A, finally flowing into the low-pressure chamber 105A in sequence. With reference to FIG. 31, when the gas after the first level of the gas pressure reduction flowing into the low-pressure chamber 105A has reached to a predetermined value, the gas pressure in the low-pressure chamber 105A in addition to the returned elasticity of the second low-pressure elastic element 45A is higher than a resultant force that is accumulated from the first low-pressure elastic element 42A and the gas pressure in the intermediate channel 341A. Meanwhile, the low-pressure piston 41A is pushed back to the original position and the low-pressure airproof part 43A closes the communication between the low-pressure channel 413A and the intermediate chamber 103A again. When the gas pressure in the low-pressure chamber 105A is reduced to a scale that the returned elasticity of the first low-pressure elastic element 42A in addition to the gas pressure in the intermediate channel 341A is enough to resist a sum of the gas pressure in the low-pressure chamber 105A and the returned elasticity of the second low-pressure elastic element 45A, the first low-pressure elastic element 42A pushes the low-pressure piston 41A to the status shown in FIG. 26. Then the gas after the first level of the gas pressure reduction is capable of flowing through the intermediate channel 341A into the low-pressure chamber 105A again. As a result, the predetermined value of the gas pressure allowable for flowing through the intermediate channel 341A may be adjusted by the coefficient of elasticity of the first low-pressure elastic element 42A as well as the scale of the preliminary compression of the second low-pressure elastic element 45A so as to achieve the objective of reducing the gas pressure at the second level.

Furthermore, the pressure regulator 1A in accordance with the present invention has equipped with the airproof rings in the appropriate positions to prevent the occurrence of the gas interference. The following examples are for the illustrations only and constitutes no further restriction. A first airproof ring is mounted around the piston rod 312A of the high-pressure piston 31A to prevent the gas from the gas inlet orifice 101A to flow into the high-pressure piston chamber 102A. A second airproof ring is mounted around the enlarged head 311A of the high-pressure piston 31A to prevent the gas in the intermediate chamber 103A from flowing into the high-pressure piston chamber 102A. A third airproof ring is mounted around the high-pressure connection part 34A to prevent the gas in the intermediate chamber 103A from leaking through a slit between the high-pressure connection part 34A and the internal tube 12A. A fourth and a fifth airproof rings are respectively mounted around the enlarged head 411A and the piston rod 412A of the low-pressure piston 41A to prevent the communication among the low-pressure piston chamber 104A, the intermediate chamber 103A and the low-pressure chamber 105A.

Furthermore, the high-pressure elastic element 32A, the first low-pressure elastic element 42A and the second low-pressure elastic element 45A include any kind of appropriate elastic elements but not limited to the elastic elements such as the spring, the flat spring, the resilient washer and clip etc.

Figure 32:
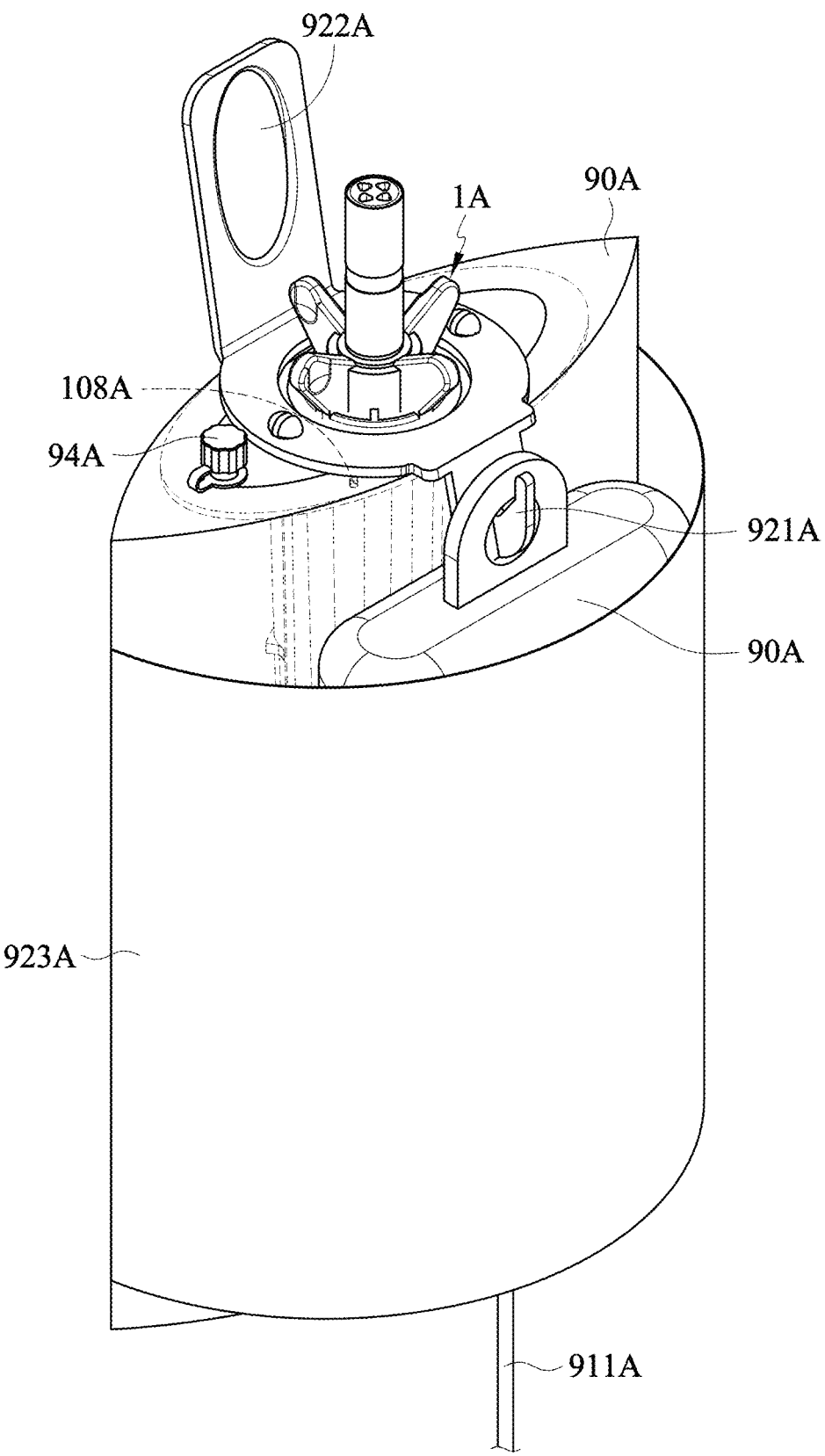
FIG. 32 is a perspective view of another embodiment of a gas storage device showing an action of the gas storage device in accordance with the present invention.

Generally with reference to FIG. 20, FIG. 21 and FIG. 32, the pressure regulator 1A is assembled with a gas storage unit 90A to form a gas storage device in normal application. The internal tube 12A is inserted inside the gas storage unit 90A, the external tube 11A has a first portion sheathed inside the gas storage unit 90A and a second portion exposed outside the gas storage unit 90A. Particularly, the high-pressure exhaustion channel of the valve assembly 10A has an axial opening 108A exposed outside the gas storage unit 90A. The gas storage unit 90 A is attached to a lateral side of an intravenous bag 91A. For the sake of convenience, a hanger assembly 92A is disposed outside the pressure regulator 1A so that the gas storage unit 90 A and the intravenous bag 91A is disposed as closer to each other as possible. The hanger assembly 92A mounted around the pressure regulator 1A has a hook 921A provided for hanging the intravenous bag 91A so that the intravenous bag 91A is capable of attaching to the gas storage unit 90 A closely. The hanger assembly 92A has an annular body 922A provided for hanging an assembly of the pressure regulator 1A, the gas storage unit 90A and the intravenous bag 91A at an appropriate position. Additionally, the hanger assembly 92A may have a cover wrap 923A embracing the intravenous bag 91A, which is provided for constricting the intravenous bag 91A and the gas storage unit 90A. A high-pressure source assembly 93A disposed in the gas storage unit 90A is connected with the gas-input assembly 20A of the pressure regulator 1A. The high-pressure source assembly 93A has a holding bracket 931A and a high-pressure gas bottle 932A. The holding bracket 931A is screwed outside a bottom end of the external tube 11A. The high-pressure gas bottle 932A is mounted securely on the holding bracket 931A and disposed corresponding to the puncturing unit 21A of the gas-input assembly 20A.

Figure 33:
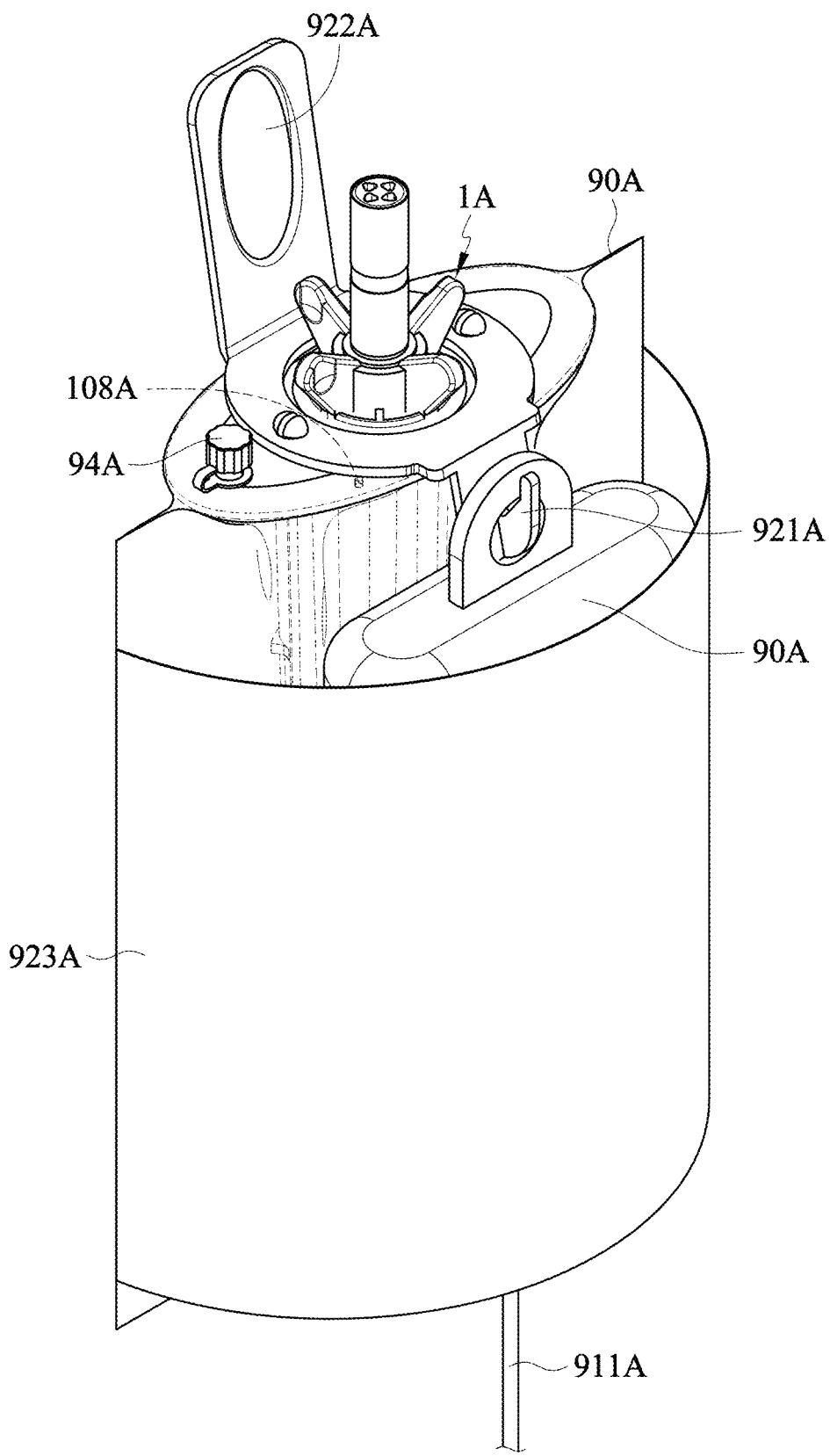
FIG. 33 is another perspective view of another embodiment of a gas storage device showing an action of the gas storage device in accordance with the present invention.
Figure 34:
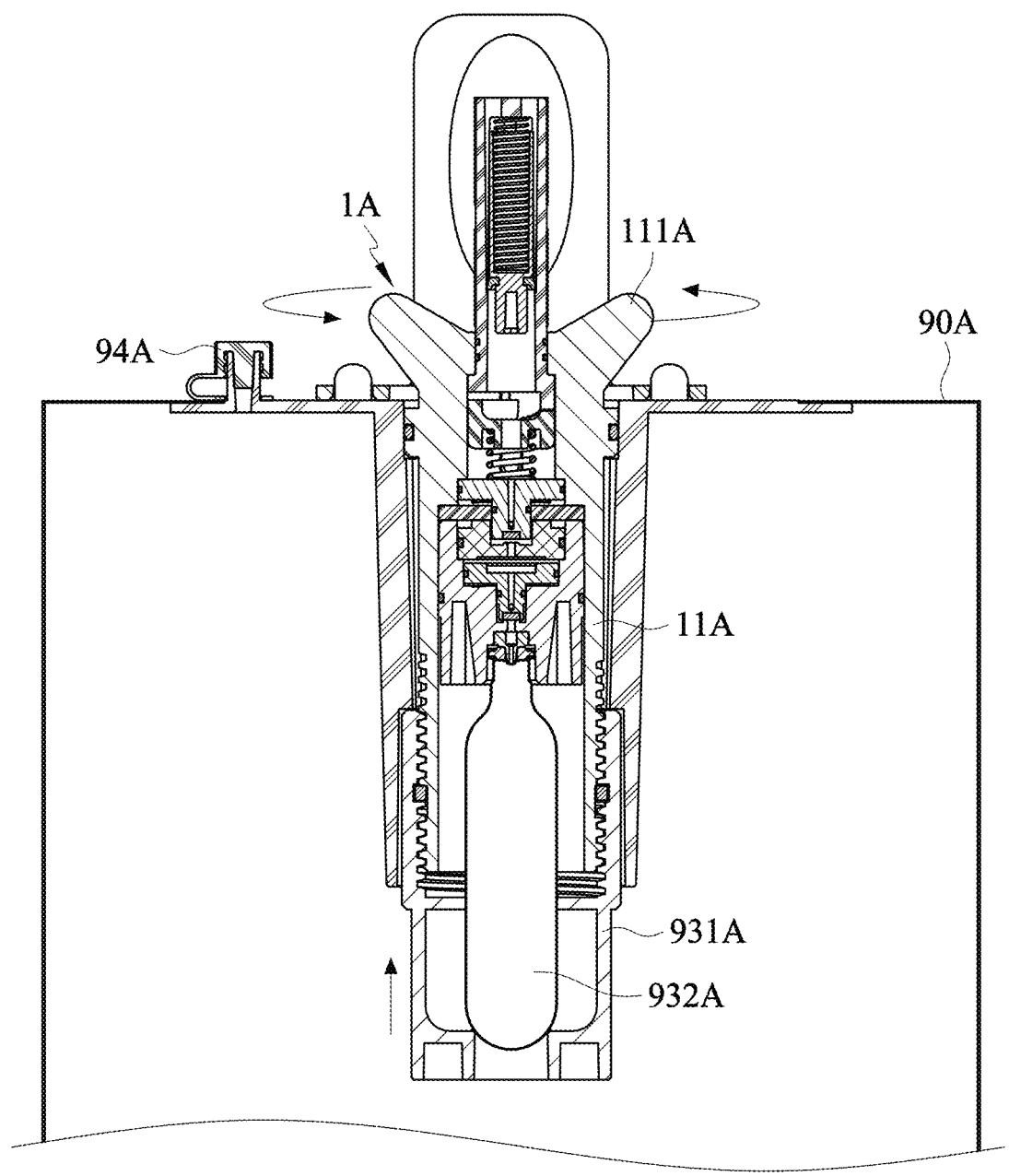
FIG. 34 is a cross sectional view from a seventh lateral side of another embodiment of a gas storage device showing an internal action of the gas storage device in accordance with the present invention.

Before the practical use, with reference to FIG. 23 and FIG. 33, the high-pressure gas bottle 932A has no contact with the puncturing unit 21A yet. In the meantime, the valve assembly 10A is not injected with any high-pressure gas and there is no gas in the gas storage unit 90A. In consequence, the gas storage unit 90A is loosen and incapable of pressing the intravenous bag 91A. With reference to FIG. 26, FIG. 32 and FIG. 34, when the intravenous bag 91A is prepared for a press and further use, turning the hand-holding part 111A of the external tube 11A makes the external tube 11A rotate relative to the holding bracket 931A. Because the external tube 11A and the holding bracket 931A are screwed with each other, the holding bracket 931A follows the screw thread and moves axially when a relative rotation occurs between the external tube 11A and the holding bracket 931A. In consequence, the high-pressure gas bottle 932A is carried by the holding bracket 931A and moved towards the puncturing unit 21A. The continuous rotation of the external tube 11A makes the high-pressure gas bottle 932A pierced by the sharp end 211A of the puncturing unit 21A eventually. As a result, a high-pressure gas in the high-pressure gas bottle 932A flows through the internal channel 212A of the puncturing unit 21A into the gas inlet orifice 101A of the valve assembly 10A. After the regulation operated by the first regulating assembly 30 and the second regulating assembly 40, a gas having a reduced scale of the required gas pressure is stored in the low-pressure chamber 105A and capable of flowing through the gas outlet orifice 106A into the gas storage unit 90A. For example, a high-pressure gas in the high-pressure gas bottle 932A has a gas pressure amount to 900~1300 psi. After a first reduction of the gas pressure by the first regulating assembly 30A as well as a second reduction of the gas pressure by the second regulating assembly 40A, an output gas pressure flowing into the gas storage unit 90A is reduced to a scale between 5~6 psi. Therefore, the output gas pressure in the gas storage unit 90A is maintained between 5~6 psi, which is adapted for pressing the intravenous bag 91A and squeezing the fluid from the intravenous bag 91A into the flexible tube 911A, at last injecting into the human body.

When the objective device finishes the use of the pressure regulator, the gas in the gas storage unit 90A could be exhausted throughout the gas releasing cover 94A.

The intravenous bag 91A pressed by the gas storage unit 90A in accordance with the present invention makes it unnecessary for the intravenous bag 91A to be held at a position higher than an injection needle as a conventional way of applying a pressure resulted from the elevation difference for the intravenous drip (taking the intravenous bag hung at the drip stand as an example). Instead, the application of the pressure regulator 1A and the gas storage unit 90A in accordance with the present invention is able to achieve the objective of applying the press to the intravenous bag 91A to inject the fluid from the intravenous bag 91A at any elevation. Therefore, the application of the pressure regulator 1A and the gas storage unit 90A in accordance with the present invention makes it possible for the users to carry the intravenous bag 91A with themselves even when they are moving or inconvenient of using the drip stand. Furthermore, with inserting a portion of the external tube 11A and the internal tube 12A in the gas storage unit 90A, a volume of the combination of the pressure regulator 1A and the gas storage unit 90A are reduced. Besides, further considering the normal action of the high-pressure piston chamber 102A sheathed inside the gas storage unit 90A, when the high-pressure piston 31A initiates a compression stroke in the high-pressure piston chamber 102A axially, it would be necessary for the high-pressure piston chamber 102A to exhaust the gas after the compression and supply the gas after the expansion. However, the high-pressure piston chamber 102A cannot communicate with the gas storage unit 90A internally throughout the opening of the internal tube 12A directly. In case that the high-pressure gas in the gas storage unit 90A enters into the high-pressure piston chamber 102A, it would cause the malfunction or even the damage to the high-pressure piston chamber 102A. As a result, the structural collocation of the internal tube 12A and the external tube 11A makes the high-pressure piston chamber 102A communicate with the outside of the gas storage unit 90A throughout the high-pressure exhaustion channel of the valve assembly 10A. In consequence, the high-pressure piston chamber 102A exhausts the gas to the outside atmosphere throughout the high-pressure exhaustion channel or supply the gas from the outside atmosphere, so that the normal action of the high-pressure piston 31A is maintained and the malfunction of the high-pressure elastic element 32A resulted from the vacuum status of the high-pressure piston chamber 102A due to the shortage of the air could be avoided.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pressure regulator for partially being mounted inside a gas storage unit, comprising:
   a valve tube assembly having
      an external tube; and
      an internal tube mounted within the external tube;
   a gas inlet orifice disposed at a bottom end of the internal tube;
   a gas outlet orifice formed transversely through the external tube;
   a high-pressure piston chamber disposed in the internal tube and adapted to be kept from communicating with the gas storage unit and communicating with an outside of the valve tube assembly and of the gas storage unit through a high-pressure exhaustion channel;
   an intermediate chamber disposed in the internal tube, wherein the gas inlet orifice, the high-pressure piston chamber and the intermediate chamber are disposed in the internal tube in sequence;
   a low-pressure chamber disposed in the external tube, disposed corresponding to a top end of the internal tube, communicating with the gas outlet orifice, and selectively communicating with the intermediate chamber;
a low-pressure piston chamber disposed in the external tube and disposed corresponding to the top end of the internal tube; and
the high-pressure exhaustion channel having
a radial part communicating with the high-pressure piston chamber; and
an axial opening formed through the external tube and communicating with an outside of the valve tube assembly;
a gas-input assembly disposed in the gas inlet orifice of the valve tube assembly;
a first regulating assembly disposed in the high-pressure piston chamber and the intermediate chamber of the valve tube assembly and adapted to reduce a gas pressure of a gas flowing through the first regulating assembly; and
a second regulating assembly disposed in the low-pressure piston chamber and the low-pressure chamber of the valve tube assembly and adapted to reduce a gas pressure of a gas flowing from the intermediate chamber into the second regulating assembly.

2. The pressure regulator as claimed in claim 1, wherein the external tube has a top end formed as a hand-holding part extending transversely.

3. The pressure regulator as claimed in claim 1, wherein the gas-input assembly has a puncturing unit having
a sharp end; and
an internal channel having an opening at each of the both ends and communicating with the openings of the internal channel.

4. The pressure regulator as claimed in claim 1, wherein the first regulating assembly comprises:
a high-pressure piston is disposed in the high-pressure piston chamber and having an enlarged head;
a piston rod formed axially on the enlarged head;
a high-pressure channel formed axially through the piston rod and selectively communicating with the gas inlet orifice;
a lateral side having at least one through hole formed transversely through the piston rod;
a high-pressure elastic element mounted around the piston rod of the high-pressure piston and clamped between the enlarged head of the high-pressure piston and a high-pressure stepped part of the high-pressure piston chamber;
a high-pressure airproof part attached to an end of the piston rod of the high-pressure piston to selectively close the communication between the high-pressure channel and the gas-inlet orifice; and
a high-pressure connection part, disposed in the intermediate chamber and having
a first end disposed next to the enlarged head of the high-pressure piston; and
an intermediate channel formed axially through the high-pressure connection part and communicating with the high-pressure channel of the high-pressure piston.

5. The pressure regulator as claimed in claim 1, wherein the second regulating assembly comprises:
a low-pressure piston disposed in the low-pressure piston chamber, disposed next to a high-pressure connection part and having
an enlarged head;
a piston rod formed axially on the enlarged head;
a low-pressure channel formed axially through the piston rod of the low-pressure piston and selectively communicating with the intermediate channel of the high-pressure connection part; and
a lateral side having at least one through hole formed transversely through the piston rod;
a first low-pressure elastic element mounted around the piston rod of the low-pressure piston, disposed in the low-pressure piston chamber and clamped between the enlarged head of the low-pressure piston and the high-pressure connection part;
a low-pressure airproof part attached to an end of the piston rod of the low-pressure piston so as to selectively close the communication between the low-pressure channel and the intermediate channel;
a regulating unit disposed in the low-pressure chamber and protruding out of a top end of the external tube; and
a second low-pressure elastic element clamped between the regulating unit and the enlarged head of the low-pressure piston.

6. The pressure regulator as claimed in claim 5, wherein the second regulating assembly has
an actuator having an inclined surface; and
a driven element rotatably attached the actuator and having an inclined surface corresponding to the inclined surface of the actuator so that the driven element moves axially when the actuator rotates relative to the driven element; and
the second low-pressure elastic element is clamped between the driven element and the enlarged head of the low-pressure piston.

* * * * *